(12) United States Patent
Raj et al.

(10) Patent No.: US 7,425,603 B2
(45) Date of Patent: Sep. 16, 2008

(54) POLYMERS, POLYMER COMPOSITIONS, AND METHOD OF PREPARATION

(75) Inventors: T. Tilak Raj, Bangalore (IN); Radhakrishna Arakali Srinivasarao, Bangalore (IN); Jan-Pleun Lens, Breda (NL); Subrahmanya Bhat K., Karnataka (IN); Umesh Hasyagar, Karnataka (IN); Subash Scindia, Karnataka (IN)

(73) Assignee: General Electric Company, Schenectady, NY (US)

( * ) Notice: Subject to any disclaimer, the term of this patent is extended or adjusted under 35 U.S.C. 154(b) by 342 days.

(21) Appl. No.: 11/288,995

(22) Filed: Nov. 29, 2005

(65) Prior Publication Data

US 2007/0123682 A1  May 31, 2007

(51) Int. Cl.
*C08G 64/00* (2006.01)
(52) U.S. Cl. .................. 528/196; 528/125; 528/176; 528/198; 548/476; 560/59; 560/76; 560/96
(58) Field of Classification Search .............. 528/125, 528/176, 196, 198; 548/476; 560/59, 76, 560/96
See application file for complete search history.

(56) References Cited

U.S. PATENT DOCUMENTS

| 4,514,334 | A | 4/1985 | Mark | |
|---|---|---|---|---|
| 2003/0130417 | A1* | 7/2003 | Epple et al. | 525/10 |
| 2007/0123713 | A1* | 5/2007 | Raj et al. | 548/476 |

FOREIGN PATENT DOCUMENTS

WO  0026267 A1  5/2000

OTHER PUBLICATIONS

U.S. Appl. No. 11/289,070, filed Nov. 29, 2005; Polycyclic Dihydroxy Compound and Methods for Preparation; 58 pages.
Leu, C.-M., et al; "Dendritic poly(ether-imide)s: synthesis, characterization, and modification"; Polymer 42 (2001) pp. 2339-2348; www.elsevier.nl/locate/polymer.
Leu, Chyi-Ming, et al; "Synthesis and Characterization of Dendritic Poly(ether imide)s"; Macromolecules; 2000; 33 pp. 2855-2861.
Li, Xiuru, et al.; "Synthesis and Characterization of Hyperbranched Aromatic Poly(ether imide)s";Macromolecules; 2003; 36; pp. 5537-5544.
Li, Xiu-Ru, et al.; Synthesis and characterization of hyperbranched aromatic poly(ether-imide)s: Polymer; 44; (2003); pp. 3855-3863; www.elsevier.com/locate/polymer.
Morgan, P.W.; "Aromatic Polyesters with Large Cross-Planar Substituents"; Macromolecules; vol. 3; No. 5; Sep.-Oct. 1970; pp. 536-433.
Wu, Fang-Iy, et al.; "Hyperbranched Aromatic Poly(ether imide)s: Synthesis, Characterization, and Modification"; Journal of Polymer Science: Part A: Polymer Chemistry; vol. 39; 2536-2546 (2001).
International Search Report; International Application No. PCT/US2006/045344; International Filing Date Nov. 27, 2006; Date of Mailing May 15, 2007; File Reference RD189012; (7 pages).

* cited by examiner

*Primary Examiner*—Terressa Boykin

(57) ABSTRACT

A polymer comprising structural units derived from a polycyclic dihydroxy compound of Formula (I)

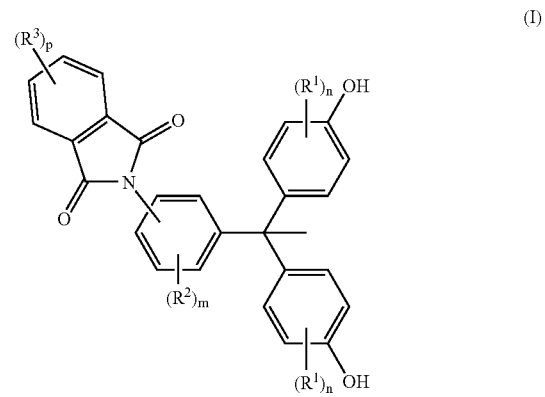

wherein $R^1$, $R^2$ and $R^3$ are independently at each occurrence selected from the group consisting of a cyano functionality, a halogen, an aliphatic functionality having 1 to 10 carbons, a cycloaliphatic functionality having 3 to 10 carbons, and an aromatic functionality having 6 to 10 carbons; wherein each occurrence of "n", "m", and "p" independently has a value of 0, 1, 2, 3, or 4; and wherein the polymer is substantially linear.

40 Claims, No Drawings

POLYMERS, POLYMER COMPOSITIONS, AND METHOD OF PREPARATION

BACKGROUND

This disclosure generally relates to polycyclic dihydroxy aromatic compounds. More particularly the disclosure relates to polycyclic dihydroxy aromatic compounds, methods for preparing the compounds, and polymers and polymer compositions made using the polycyclic dihydroxy aromatic compounds.

Polycyclic dihydroxy aromatic compounds are generally known to be useful in the preparation of polymers that exhibit exceptional properties like high glass transition temperature ($T_g$), high refractive index (RI), chemical resistance, and barrier properties. Materials having the above mentioned properties are in great demand for use in various applications like automotives, optical media, storage and others.

Accordingly, there is a continuing need for new compounds that will provide polymers with better chemical resistance and at the same time have high $T_g$ and RI values, to enable their use in forming a gamut of articles.

BRIEF SUMMARY

Disclosed herein is a process of forming a polycyclic dihydroxy compound comprising, reacting a phenol compound of Formula (II) with a nitro-substituted acetophenone compound of Formula (III) in the presence of an aromatic sulfonic acid to produce a nitro-substituted polycyclic dihydroxy compound of Formula (IV)

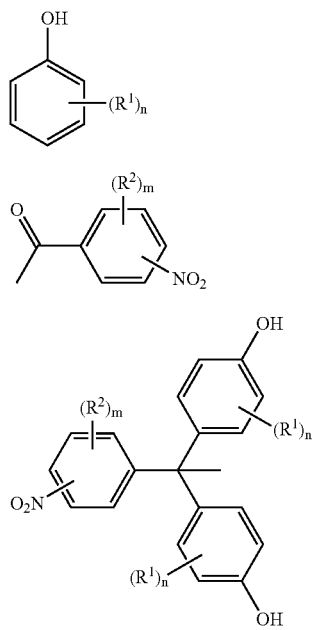

wherein $R^1$ and $R^2$ are independently at each occurrence selected from the group consisting of a cyano functionality, a halogen, an aliphatic functionality having 1 to 10 carbons, a cycloaliphatic functionality having 3 to 10 carbons, and an aromatic functionality having 6 to 10 carbons; and wherein each occurrence of "n" and "m" independently has a value of 0, 1, 2, 3, or 4; reducing the nitro-substituted polycyclic dihydroxy compound of Formula (IV) to produce an amine-substituted polycyclic dihydroxy compound of Formula (V)

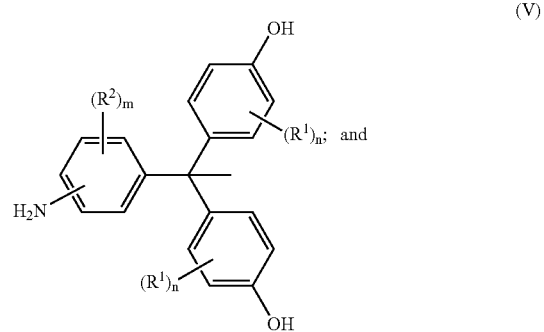

reacting the amine-substituted polycyclic dihydroxy compound of Formula (V) with a phthalic anhydride compound of Formula (VI) to produce a phthalimide-substituted polycyclic dihydroxy compound of Formula (I)

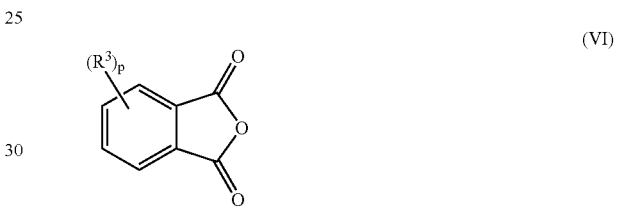

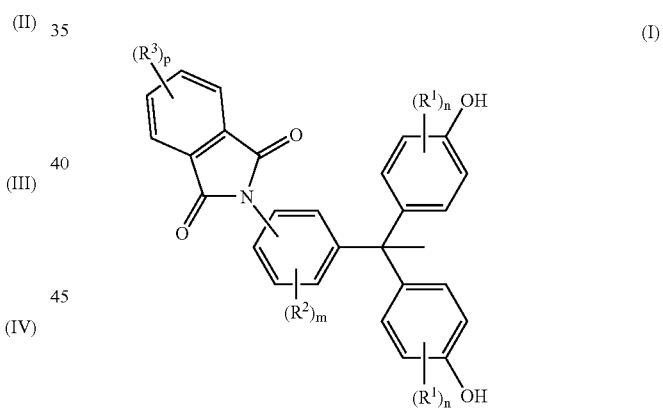

wherein $R^3$ is independently at each occurrence selected from the group consisting of a cyano functionality, a halogen, an aliphatic functionality having 1 to 10 carbons, a cycloaliphatic functionality having 3 to 10 carbons, and an aromatic functionality having 6 to 10 carbons; wherein each occurrence of "p" independently has a value of 0, 1, 2, 3, or 4; and wherein $R^1$, $R^2$, "n" and "m" have the same meaning as defined above.

In another embodiment a process of forming a polycyclic dihydroxy compound comprises reacting phenol with a nitro-substituted acetophenone compound selected from 3-nitroacetophenone, 4-nitroacetophenone, and mixtures thereof, in the presence of p-toluenesulfonic acid to produce a nitro-substituted polycyclic dihydroxy compound of Formula (VII)

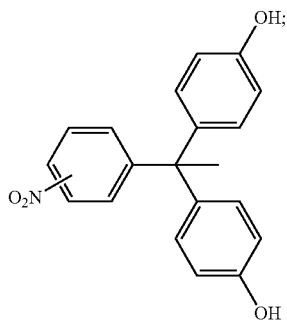

reducing the nitro-substituted polycyclic dihydroxy compound with hydrogen in the presence of a palladium on carbon catalyst to produce an amine-substituted polycyclic dihydroxy compound of Formula (VIII)

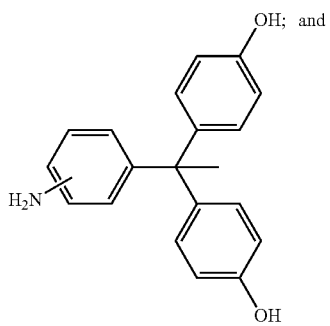

reacting the amine-substituted polycyclic dihydroxy compound with phthalic anhydride in the presence of acetic acid to produce a phthalimide-substituted polycyclic dihydroxy compound of Formula (IX)

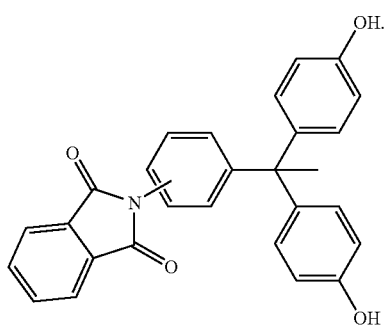

In one embodiment is provided a compound of Formula (X)

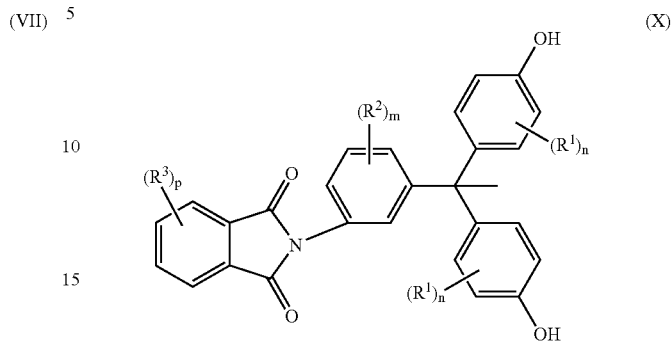

wherein $R^1$, $R^2$ and $R^3$ are independently at each occurrence selected from the group consisting of a cyano functionality, a halogen, an aliphatic functionality having 1 to 10 carbons, a cycloaliphatic functionality having 3 to 10 carbons, and an aromatic functionality having 6 to 10 carbons; and wherein each occurrence of "n", "m", and "p" independently has a value of 0, 1, 2, 3, or 4.

In one embodiment is provided a substantially linear polymer comprising structural units derived from a polycyclic dihydroxy compound of Formula (I)

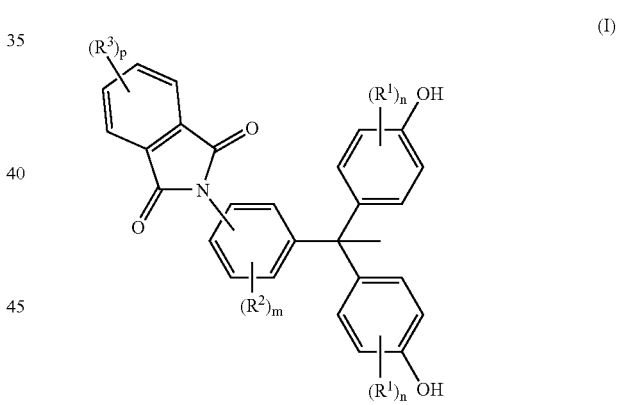

wherein $R^1$, $R^2$ and $R^3$ are independently at each occurrence selected from the group consisting of a cyano functionality, a halogen, an aliphatic functionality having 1 to 10 carbons, a cycloaliphatic functionality having 3 to 10 carbons, and an aromatic functionality having 6 to 10 carbons; and wherein each occurrence of "n", "m", and "p" independently has a value of 0, 1, 2, 3, or 4.

In one embodiment a process for preparing a polymer comprising structural units derived from a polycyclic dihydroxy compound of Formula (I) comprises subjecting a polycyclic dihydroxy compound of Formula (I) to polymerization, wherein the polymer is a substantially linear polymer.

Also disclosed herein are methods of making the polymer, compositions comprising the polymer, and articles comprising the polymer.

The disclosure may be understood more readily by reference to the following detailed description of the various features of the disclosure and the examples included therein.

DETAILED DESCRIPTION

Disclosed herein are polycyclic dihydroxy aromatic compounds and methods for preparing these compounds. These compounds may find applications as monomers in the preparation of polymers, especially in the preparation of polymers having chemical resistance, high RI, and high $T_g$.

The singular forms "a", "an" and "the" include plural referents unless the context clearly dictates otherwise. All ranges disclosed herein are inclusive and combinable (for example ranges of "up to 25 wt. (weight) percent, with 5 wt. percent to 20 wt. percent desired," is inclusive of the endpoints and all intermediate values of the ranges of "5 wt. percent to 25 wt. percent").

The modifier "about" used in connection with a quantity is inclusive of the stated value and has the meaning dictated by the context (for example, includes the degree of error associated with measurement of the particular quantity).

Unless otherwise specified, the term "cycloaliphatic functionality" designates cyclic aliphatic functionalities having a valence of at least one, and comprising an array of atoms which is cyclic but which is not aromatic. A "cycloaliphatic functionality" may comprise one or more noncyclic components. For example, a cyclohexylmethyl group ($C_6H_{11}CH_2$—) is a cycloaliphatic functionality that comprises a cyclohexyl ring (the array of atoms which is cyclic but which is not aromatic) and a methylene group (the noncyclic component). The cycloaliphatic functionality may include heteroatoms such as nitrogen, sulfur, selenium, silicon and oxygen, or may be composed exclusively of carbon and hydrogen. For convenience, the term "cycloaliphatic functionality" is defined herein to encompass a wide range of functional groups such as alkyl groups, alkenyl groups, alkynyl groups, haloalkyl groups, conjugated dienyl groups, alcohol groups, ether groups, carboxylic acid groups, acyl groups (for example carboxylic acid derivatives such as esters and amides), amine groups and nitro groups. For example, the 4-methylcyclopent-1-yl group is a $C_6$ cycloaliphatic functionality comprising a methyl group, wherein the methyl group is a functional group that is an alkyl group. Similarly, the 2-nitrocyclobut-1-yl group is a $C_4$ cycloaliphatic functionality comprising a nitro group, wherein the nitro group is a functional group. A cycloaliphatic functionality may comprise one or more halogen atoms which may be the same or different. Halogen atoms include, for example, fluorine, chlorine, bromine, and iodine. Exemplary cycloaliphatic functionalities comprise cyclopropyl, cyclobutyl, 1,1,4,4-tetramethylcyclobutyl, piperidinyl, 2,2,6,6-tetramethylpiperydinyl, and cyclohexyl, and cyclopentyl.

As used herein, the term "aromatic functionality" refers to an array of atoms having a valence of at least one comprising at least one aromatic group. The array of atoms having a valence of at least one comprising at least one aromatic group may include heteroatoms such as nitrogen, sulfur, selenium, silicon and oxygen, or may be composed exclusively of carbon and hydrogen. As used herein, the term "aromatic functionality" includes but is not limited to phenyl, pyridyl, furanyl, thienyl, naphthyl, phenylene, and biphenyl functionalities. The aromatic functionality may also include nonaromatic components. For example, a benzyl group is an aromatic functionality that comprises a phenyl ring (the aromatic group) and a methylene group (the nonaromatic component). Similarly a tetrahydronaphthyl functionality is an aromatic functionality comprising an aromatic group ($C_6H_3$) fused to a nonaromatic component —$(CH_2)_4$—. For convenience, the term "aromatic functionality" is defined herein to encompass a wide range of functional groups such as alkyl groups, haloalkyl groups, haloaromatic groups, alcohol groups, ether groups, carboxylic acid groups, acyl groups (for example carboxylic acid derivatives such as esters and amides), amine groups and nitro groups. For example, the 4-methylphenyl functionality is a $C_7$ aromatic functionality comprising a methyl group, wherein the methyl group is a functional group that is an alkyl group. Similarly, the 2-nitrophenyl group is a $C_6$ aromatic functionality comprising a nitro group, wherein the nitro group is a functional group. Aromatic functionalities include halogenated aromatic functionalities. Exemplary aromatic functionalities include, but are not limited to phenyl, 4-trifluoromethylphenyl, 4-chloromethylphen-1-yl, 3-trichloromethylphen-1-yl(3-$CCl_3$Ph-), 4-(3-bromoprop-1-yl)phen-1-yl(4-$BrCH_2CH_2CH_2$Ph-), 4-aminophen-1-yl(4-$H_2N$Ph-), 4-hydroxymethylphen-1-yl (4-$HOCH_2$Ph-), 4-methylthiophen-1-yl (4-$CH_3S$Ph-), 3-methoxyphen-1-yl and 2-nitromethylphen-1-yl(2-$NO_2CH_2$Ph), and naphthyl.

As used herein the term "aliphatic functionality" refers to an organic functionality having a valence of at least one consisting of a linear or branched array of atoms that is not cyclic. Aliphatic functionalities are defined to comprise at least one carbon atom. The array of atoms comprising the aliphatic functionality may include heteroatoms such as nitrogen, sulfur, silicon, selenium and oxygen or may be composed exclusively of carbon and hydrogen. For convenience, the term "aliphatic functionality" is defined herein to encompass, as part of the "linear or branched array of atoms which is not cyclic," a wide range of functional groups such as alkyl groups, haloalkyl groups, alcohol groups, ether groups, carboxylic acid groups, acyl groups (for example carboxylic acid derivatives such as esters and amides), amine groups and nitro groups. For example, the 4-methylpent-1-yl is a $C_6$ aliphatic functionality comprising a methyl group, wherein the methyl group is a functional group that is an alkyl group. Similarly, the 4-nitrobut-1-yl group is a $C_4$ aliphatic functionality comprising a nitro group, wherein the nitro group is a functional group. An aliphatic functionality may be a haloalkyl group which comprises one or more halogen atoms which may be the same or different. Halogen atoms include, for example; fluorine, chlorine, bromine, and iodine. Exemplary aliphatic functionalities include, but are not limited to methyl, ethyl, propyl, isopropyl, butyl, isobutyl, pentyl, isopentyl, trifluoromethyl, bromodifluoromethyl, chlorodifluoromethyl, chloromethyl, trichloromethyl, bromoethyl, 2-hexyl, hexamethylene, hydroxymethyl (i.e., —$CH_2OH$), mercaptomethyl(—$CH_2SH$), methylthio(—$SCH_3$), methylthiomethyl(—$CH_2SCH_3$), methoxy, methoxycarbonyl(—$C(O)OCH_3$), nitromethyl(—$CH_2NO_2$), and thiocarbonyl.

Disclosed herein is a process of forming a polycyclic dihydroxy compound comprising, reacting a phenol compound of Formula (II) with a nitro-substituted acetophenone compound of Formula (III) in the presence of an aromatic sulfonic acid to produce a nitro-substituted polycyclic dihydroxy compound of Formula (IV)

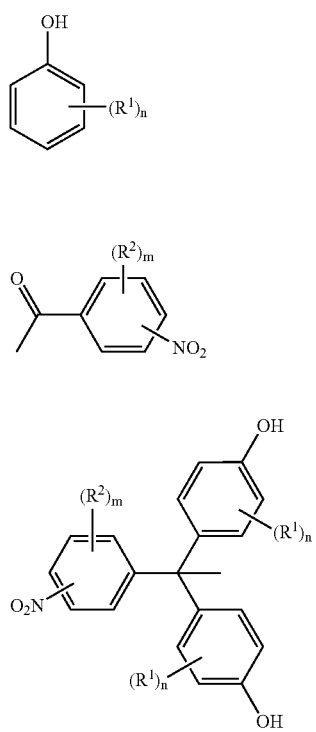

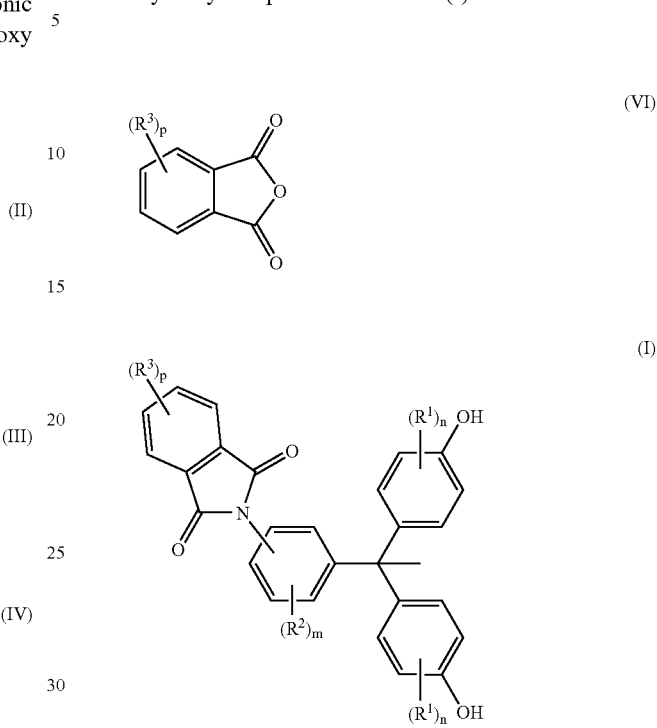

wherein $R^1$ and $R^2$ are independently at each occurrence selected from the group consisting of a cyano functionality, a halogen, an aliphatic functionality having 1 to 10 carbons, a cycloaliphatic functionality having 3 to 10 carbons, and an aromatic functionality having 6 to 10 carbons; and wherein each occurrence of "n" and "m" independently has a value of 0, 1, 2, 3, or 4; reducing the nitro-substituted polycyclic dihydroxy compound of Formula (IV) to produce an amine-substituted polycyclic dihydroxy compound of Formula (V)

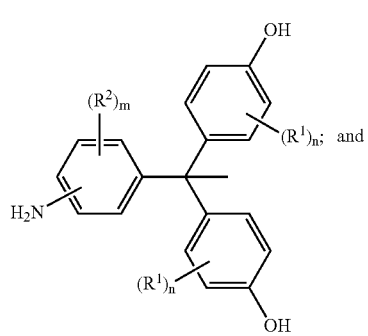

reacting the amine-substituted polycyclic dihydroxy compound of Formula (V) with a phthalic anhydride compound of Formula (VI) to produce a phthalimide-substituted polycyclic dihydroxy compound of Formula (I)

wherein $R^3$ is independently at each occurrence selected from the group consisting of a cyano functionality, a halogen, an aliphatic functionality having 1 to 10 carbons, a cycloaliphatic functionality having 3 to 10 carbons, and an aromatic functionality having 6 to 10 carbons; wherein each occurrence of "p" independently has a value of 0, 1, 2, 3, or 4; and wherein $R^1$, $R^2$, "n" and "m" have the same meaning as defined above.

In one embodiment the polycyclic dihydroxy aromatic compound comprises compounds of Formula (IX)

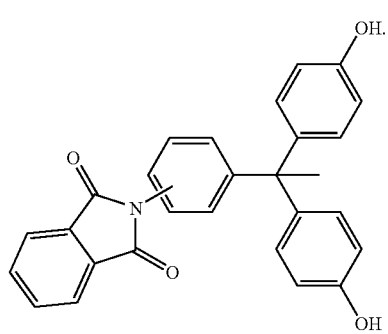

The process for making the polycyclic dihydroxy compound of Formula (I) comprises the following steps. The first step comprises reacting a phenol compound of Formula (II) with a nitro-substituted acetophenone compound of Formula (III) in the presence of an aromatic sulfonic acid to produce a nitro-substituted polycyclic dihydroxy compound of Formula (IV)

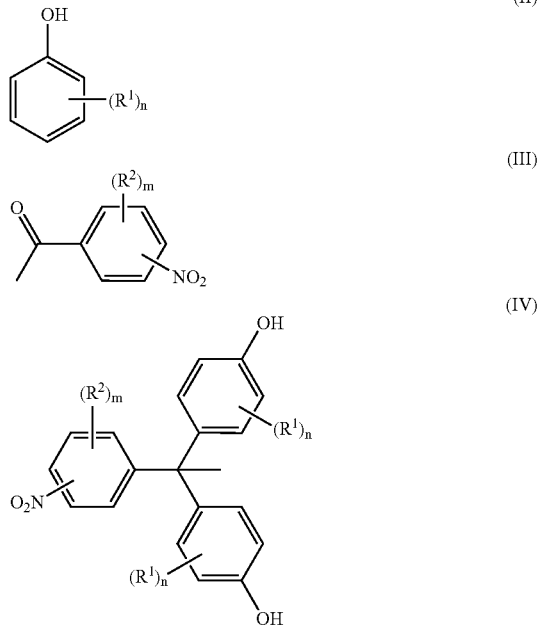

wherein $R^1$, $R^2$, "n" and "m" have the same meaning as defined above.

Suitable phenol compounds of Formula (II) include but are not limited to, phenol, 2,4-dimethylphenol, 2,6-dimethylphenol, 2,3,5-trimethylphenol, 2,4-diethylphenol, 2,6-diethylphenol, 2,3,5-triethylphenol, 2-chlorophenol, 2,3-dichlorophenol, 3-chlorophenol, 2,3,5-trichlorophenol, 2,6-dichlorophenol, and mixtures of the foregoing phenol compounds. In one embodiment the phenol compound of Formula (II) is phenol.

Suitable nitro-substituted acetophenone compounds of Formula (III) include but are not limited to 4-nitroacetophenone, 3-nitroacetophenone, and mixtures of the foregoing nitro-substituted acetophenone compounds. In one embodiment the compounds of Formula (III) are selected from 4-nitroacetophenone, 3-nitroacetophenone, and mixtures of the foregoing compounds.

The amount of the phenol compound of Formula (II) employed in the reaction can be 1 mole to about 6 moles per mole of nitro-substituted acetophenone compound of Formula (III) employed. Within this range the amount may be greater than or equal to about 2 moles. Also within this range the amount may be less than or equal to about 4 moles, or, more specifically less than or equal to about 3 moles.

Suitable acid catalysts that may be employed in the reaction of the phenol compound of Formula (II) with the nitro-substituted acetophenone compound of Formula (III) include, but are not limited to mineral acids, aromatic sulfonic acids, aliphatic sulfonic acids, cation exchange resins, and solid acid catalysts. Non-limiting examples of mineral acids include hydrogen chloride liquid, hydrogen chloride gas, sulfuric acid and nitric acid. Non-limiting examples of aromatic sulfonic acids include, benzenesulfonic acid, p-toluenesulfonic acid, and combinations thereof. Non-limiting examples of aliphatic sulfonic acids include methane sulfonic acid, ethane sulfonic acid, and combinations thereof. As used herein the term "cation exchange resin" refers to an ion exchange resin in the hydrogen form, wherein the hydrogen ions are bound to the active sites which can be removed either by dissociation in solution or by replacement with other positive ions. The active sites of the resin have different attractive strengths for different ions, and this selective attraction serves as a means for ion exchange. Non-limiting examples of suitable cation exchange resins include the series of sulfonated divinylbenzene-crosslinked styrene copolymers, such as for example, copolymers crosslinked with about 1 to about 20 weight percent of divinylbenzene relative to the overall weight of the acidic ion exchange resin. More specifically, suitable catalysts include cation exchange resins crosslinked with greater than or equal to about 8 weight percent of divinylbenzene relative to the overall weight of the acidic ion exchange resin catalyst, such as for example, Amberlyst® 15 commercially available from Aldrich Chemical Company, Bayer K2431® commercially available from Bayer Company and T-66® commercially available from Thermax, Ltd. When cation exchange resins are used as the acid, suitable promoters may be employed including, but not limited to 3-mercaptopropionic acid (hereinafter called 3-MPA), a substituted or an unsubstituted benzyl mercaptan, 3-mercapto-1-propanol, ethyl 3-mercaptopropionate, 1,4-bis(mercaptomethyl)benzene, 2-mercaptoethane-sulfonic acid, 3-mercaptopropanesulfonic acid, 4-mercaptobutanesulfonic acid, 4-mercaptopentane-sulfonic acid, 3-mercapto-2,2-dimethylpropanesulfonic acid, 2,3-dimercaptopropanesulfonic acid, mercaptopropane-2,3-disulfonic acid, 2-benzyl-4-mercaptobutanesulfonic acid, 5-mercaptopentane-sulfonic acid, methanethiol, ethanethiol, isopropanethiol, butanethiol, resorcinol, catechol, hydroquinone, or the mono- and di-methyl or mono- and di-ethyl ethers thereof, para-ethylphenol, ortho-cresol, para-cresol, phloroglucinol, alpha-naphthol, 5-methyl-alpha-naphthol, 6-isobutyl-alpha-naphthol, 1,4-dihydroxynaphthalene, 6-hexyl-1,4-dihydroxy naphthalene, and 6-methyl-4-methoxy-alpha-naphthalene.

In one embodiment the acid used is an aromatic sulfonic acid. In one specific embodiment the acid used is p-toluene sulfonic acid. The amount of acid used in the reaction can be 0.2 mole to about 3 moles per mole of Formula (III) employed. Within this range the amount may be greater than or equal to about 0.5 moles, or, more specifically greater than or equal to 1 mole. Also within this range the amount may be less than or equal to about 2.5 moles, or, more specifically less than or equal to about 2 moles.

The reaction of the phenol compound of Formula (II) and the compound of Formula (III) may be carried out in the absence or presence of a solvent. Specific examples of solvents that can be employed in the reaction include, but are not limited to, toluene, xylene, diphenyl ether, tetrahydrofuran, dimethylformamide, dimethylacetamide, and combinations thereof. In certain embodiments the amount of solvent employed in the reaction of the phenol compound of Formula (II) with the nitro-substituted acetophenone compound of Formula (III) can be about 1 liter to about 5 liters per mole of nitro-substituted acetophenone compound of Formula (III). Within this range the amount may be greater than or equal to about 2 liters, or, more specifically, greater than or equal to about 3 liters. Also within this range the amount may be less than or equal to about 4 liters. In one embodiment the reaction of the phenol compound of Formula (II) and the nitro-substituted acetophenone compound of Formula (III) is carried out in the absence of a solvent.

The temperature at which the reaction of the phenol compound of Formula (II) with the nitro-substituted acetophenone compound of Formula (III) is about 70° C. to about 160° C. Within this range the temperature may be greater than or equal to about 75° C., or, more specifically, greater than or equal to about 80° C. Also within this range the temperature may be less than or equal to about 90° C. The time taken for the reaction of the phenol compound of Formula (II) with the nitro-substituted acetophenone compound of Formula (III) can be about 30 hours to about 70 hours. Within this range the time may be greater than or equal to about 40 hours, or, more specifically, greater than or equal to about 50 hours. Also within this range the time may be less than or equal to about 60 hours.

The second step comprises reducing the nitro-substituted polycyclic dihydroxy compound of Formula (IV) to produce an amine-substituted polycyclic dihydroxy compound of Formula (V), wherein $R^1$, $R^2$, "n" and "m" have the same meaning as defined above

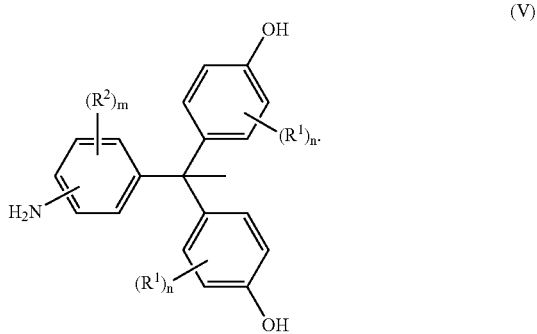

(V)

In various embodiments, the reducing of the nitro-substituted polycyclic dihydroxy compound of Formula (IV), comprises reacting the nitro-substituted polycyclic compound with hydrogen in the presence of palladium-carbon, hydrogen in the presence of platinum-carbon, iron in the presence of hydrochloric acid, zinc in the presence of hydrochloric acid, hydrazine hydrate in the presence of ferrous sulfite, hydrazine hydrate in the presence of palladium-carbon, or by other reductive methods known to one skilled in the art. In one specific embodiment hydrogen in the presence of palladium-carbon is employed for the reduction of the nitro-substituted polycyclic dihydroxy compound of Formula (IV).

When hydrogen in the presence of palladium-carbon or platinum-carbon is employed, the amount of palladium-carbon or platinum-carbon that can be employed in the reaction can be about 300 milligrams to 6000 milligram of palladium on carbon per mole of the nitro-substituted polycyclic dihydroxy compound of Formula (IV). Within this range the amount may be greater than or equal to about 350 milligrams, or, more specifically greater than or equal to about 500 milligrams. Also within this range the amount may be less than or equal to about 4000 milligrams or more specifically less than or equal to 3000 milligrams. When a stoichiometric reductant other than dihydrogen ($H_2$) is used for the reduction, the amount of stoichiometric reductant employed can be 1 mole to about 3 moles of hydrogen (—H) equivalent per mole of the nitro-substituted polycyclic dihydroxy compound of Formula (IV). Within this range the amount may be greater than or equal to about 1.25 moles, or, more specifically greater than or equal to about 1.5 moles. Also within this range the amount may be less than or equal to about 2.75 moles, or, more specifically less than or equal to about 2.5 moles.

Further, the reduction reaction may be carried out in the presence of acids. Suitable acids that can be employed in the reduction reaction of the nitro-substituted polycyclic dihydroxy compound of Formula (IV) include, but are not limited to glacial acetic acid and methanolic hydrochloric acid, and a combination thereof. Additionally solvents may be employed in the reduction reaction of the nitro-substituted polycyclic dihydroxy compound of Formula (IV). Suitable solvents that can be employed in the reduction include, but are not limited to tetrahydrofuran, dichloromethane, dimethylformamide, and combinations thereof. The acids that may be employed in the reduction reaction can also serve as solvents. In one embodiment the solvent used is glacial acetic acid.

In certain embodiments where the acid also serves as the solvent, the amount of acid or solvent employed in the reduction reaction of the nitro-substituted polycyclic dihydroxy compound of Formula (IV) can be about 1 liter to about 10 liters per mole of nitro-substituted polycyclic dihydroxy compound of Formula (IV). Within this range the amount may be greater than or equal to about 2 liters, or, more specifically, greater than or equal to about 4 liters. Also within this range the amount may be less than or equal to about 8 liters, or, more specifically less than or equal to about 6 liters. When acid is employed and additionally a solvent is employed, the amount of solvent employed is as discussed above. The amount of acid employed when a solvent is employed in the reduction reaction of the nitro-substituted polycyclic dihydroxy compound of Formula (IV) can be 1 liter to about 5 liters per mole of nitro-substituted polycyclic dihydroxy compound of Formula (IV). Within this range the amount may be greater than or equal to about 2 liters. Also within this range the amount may be less than or equal to about 4 liters.

The temperature at which the reduction reaction of the compound of Formula (V) is carried out is about 30° C. to about 80° C. Within this range the temperature may be greater than or equal to about 40° C., or, more specifically, greater than or equal to about 45° C. Also within this range the temperature may be less than or equal to about 60° C., or, more specifically, less than or equal to about 55° C. The time taken for the reduction reaction of the compound of Formula (IV) may be about 2 hours to about 48 hours. Within this range the time may be greater than or equal to about 5 hours, or, more specifically, greater than or equal to about 10 hours. Also within this range the time may be less than or equal to about 20 hours, or, more specifically, less than or equal to about 6 hours.

The third step comprises reacting the amine-substituted polycyclic dihydroxy compound of Formula (V) with a phthalic anhydride compound of Formula (VI) to produce a phthalimide-substituted polycyclic dihydroxy compound of Formula (I)

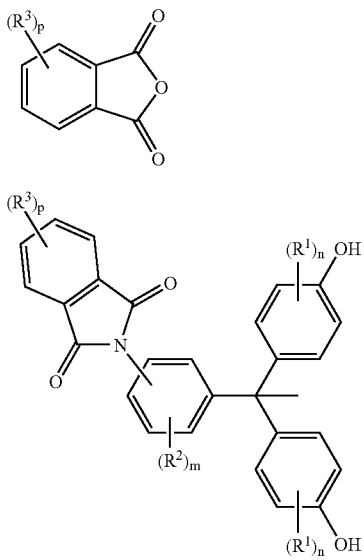

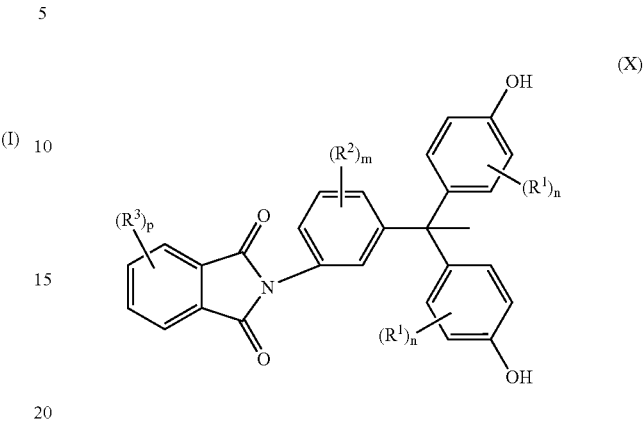

wherein $R^1$, $R^2$, $R^3$, "n" and "m" have the same meaning as defined above.

Suitable phthalic anhydride compounds having Formula (VI) include, but are not limited to phthalic anhydride, 4-chlorophthalic anhydride, 3-chlorophthalic anhydride, 3-methylphthalic anhydride and combinations thereof. In one embodiment the compound of Formula (VI) is phthalic anhydride.

The amount of the compound of Formula (VI) employed in the reaction can be 1 mole to about 3 moles per mole of compound having Formula (V). Within this range the amount may be greater than or equal to about 1.5 moles. Also within this range the amount may be less than or equal to about 2.5 moles.

Specific examples of suitable solvents that may be employed in the reaction of the compound of Formula (V) with a compound of Formula (IV) include, but are not limited to glacial acetic acid, N-methylpyrrolidone, dimethylfuran, dimethylacetamide, dimethylsulfoxide, chlorobenzene, diphenyl ether and combinations thereof. The amount of solvent employed in the reaction of the compound of Formula (V) with a compound of Formula (IV) may be about 1 liter to about 3 liters per mole of having the compound of Formula (V). Within this range the amount may be greater than or equal to about 1.2 liters, or, more specifically, greater than or equal to about 1.5 liters. Also within this range the amount may be less than or equal to about 2.5 liters, or, more specifically, less than or equal to about 2.2 liters.

The temperature in the reaction of the compound of Formula (V) with a compound of Formula (IV) can be about 60° C. to about 160° C. Within this range the temperature may be greater than or equal to about 70° C., or, more specifically, greater than or equal to about 75° C. Also within this range the temperature may be less than or equal to about 90° C., or, more specifically, less than or equal to about 85° C. The time for the reaction of the compound of Formula (V) with a compound of Formula (IV) can be about 10 hours to about 20 hours. Within this range the time may be greater than or equal to about 12 hours or, more specifically, greater than or equal to about 14 hours. Also within this range the time may be less than or equal to about 18 hours, or, more specifically, less than or equal to about 15 hours.

One embodiment is a compound of Formula (X)

wherein $R^1$, $R^2$ and $R^3$, "n" and "m" have the same meaning as defined above. In one specific embodiment the compound of Formula (X) is a compound wherein each occurrence of "m", "n", and "p" is zero. The compound of Formula (X) wherein each occurrence of "m", "n", and "p" is zero may also be referred to as N-3-[1,1'-di(4-hydroxyphenyl)ethyl] phenyl phthalimide.

As previously discussed, one of the end uses of the compounds of Formula (I) is use in the preparation of polymers for example, polycarbonates, polyesters, polyurethanes, and epoxide-containing polymers.

Accordingly, in one embodiment a polymer comprises structural units derived from a polycyclic dihydroxy compound of Formula (I)

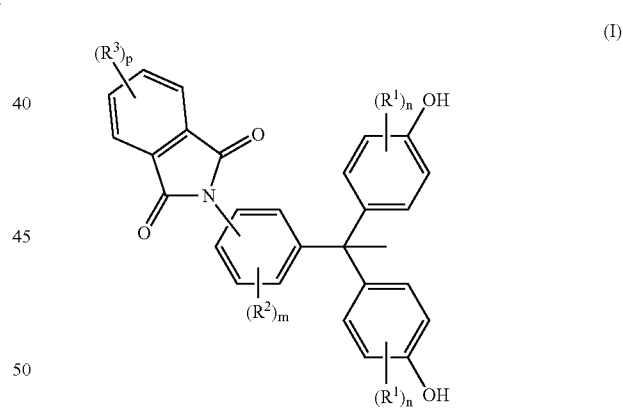

wherein $R^1$, $R^2$ and $R^3$ are independently at each occurrence selected from the group consisting of a cyano functionality, a halogen, an aliphatic functionality having 1 to 10 carbons, a cycloaliphatic functionality having 3 to 10 carbons, and an aromatic functionality having 6 to 10 carbons; wherein each occurrence of "n", "m", and "p" independently has a value of 0, 1, 2, 3, or 4; and wherein the polymer is substantially linear. A variety of polymers may comprise the structural units derived from the polycyclic dihydroxy compound of Formula (I), including, but not limited to, polycarbonates, polyesters, copolyester-polycarbonates, polyurethanes, and epoxide-containing polymers.

A "substantially linear polymer" is defined herein as a polymer comprising less than 10 mole percent of branching units, based on the total moles of monomer repeat units in the polymer. The substantially linear polymer specifically comprises less than 5 mole percent of branching units. The term "substantially linear polymer" expressly excludes highly branched polymers, such as so-called dendritic polymers.

When a structural unit of a polymer is described as "derived from a polycyclic dihydroxy compound of Formula (I)" it will be understood that the structural unit has the same chemical structure as the dihydroxy compound except that each single bond between oxygen and hydrogen in a phenolic hydroxy bond is replaced by a single bond to an adjacent structural unit. For example, a structural unit derived from the Formula (I) polycyclic dihydroxy compound has the structure (XXIII)

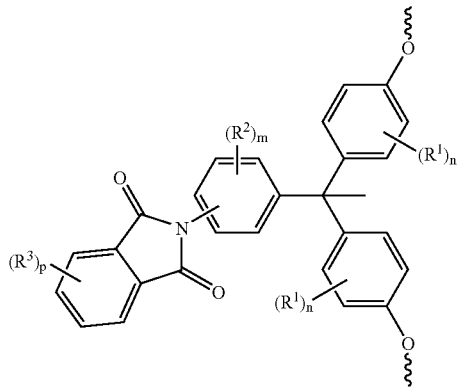

(XXIII)

wherein $R^1$, $R^2$ and $R^3$, "n", "m", and "p" have the same meaning as defined above, and wherein each wavy line represents a single bond to an adjacent structural unit.

In one embodiment a polymer comprises structural units derived from a polycyclic dihydroxy compound of Formula (XXIV) or Formula (XXV)

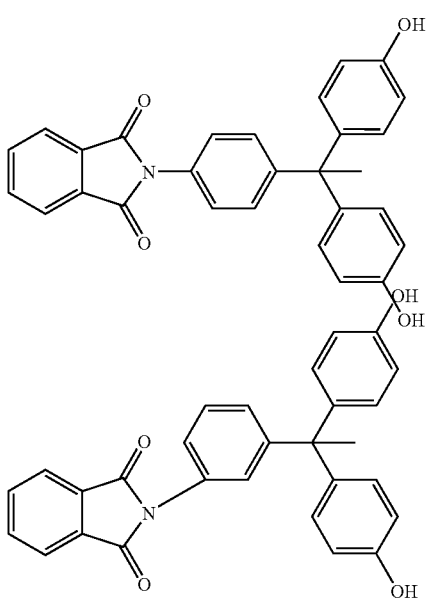

(XXIV)

or (XXV)

wherein the substantially linear polycarbonate comprises about 5 to about 50 mole percent of repeating units derived from the polycyclic dihydroxy compound of Formula (XXIV) or Formula (XXV) or a mixture of the two, and about 50 to about 95 mole percent of repeating units derived from bisphenol A. The compound of Formula (XXIV) may also be referred to as N-4-[1,1'-di(4-hydroxyphenyl)ethyl]phenyl phthalimide, and the compound of Formula (XXV) may also be referred to as N-3-[1,1'-di(4-hydroxyphenyl)ethyl]phenyl phthalimide.

"Polycarbonates" and "polycarbonate resins" as used herein are polymers comprising structural units represented by Formula (XI)

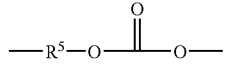

(XI)

wherein at least about 60 percent of the total number of $R^5$ groups are aromatic functionalities and the balance thereof are aliphatic, alicyclic, or aromatic functionalities and further wherein at least two $R^5$ groups are derived from a polycyclic dihydroxy compound of Formula (I). As used herein the term "at least two $R^5$ groups" refers to the polycarbonate having, on average, at least two such groups per polycarbonate molecule. In one embodiment, the polycarbonate comprises about 5 to about 100 mole percent of $R^5$ units derived from a polycyclic dihydroxy compound of Formula (I).

The aromatic functionality may also comprise a functionality of the Formula (XXVI)

$$-A^1-Y^1-A^2-$$ (XXVI)

wherein each of $A^1$ and $A^2$ is a monocyclic divalent aromatic functionality and $Y^1$ is a bridging functionality having one or two atoms that separate $A^1$ from $A^2$. In an exemplary embodiment, one atom separates $A^1$ from $A^2$. Illustrative non-limiting examples of functionalities of this type are —O—, —S—, —S(O)—, —S(O)$_2$—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging functionality $Y^1$ may be a hydrocarbon group or a saturated hydrocarbon group such as methylene, cyclohexylidene, or isopropylidene.

"Polyesters" as used herein may comprise repeating structural units of the Formula (XII)

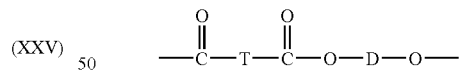

(XII)

wherein D is a divalent functionality derived from a dihydroxy compound, and may be, for example, a cycloaliphatic functionality having 6 to 10 carbon atoms, an aromatic functionality having 6 to 20 carbon atoms or an aliphatic functionality having 2 to 10 carbon atoms; wherein at least two of D are derived from a polycyclic dihydroxy compound of Formula (I); and T is a divalent functionality derived from a dicarboxylic acid, and may be, for example, a cycloaliphatic functionality having 6 to 10 carbon atoms, an aromatic functionality having 6 to 20 carbon atoms, or an aliphatic functionality having 2 to 10 carbon atoms.

In one embodiment, D comprises an aliphatic functionality having 2 to 10 carbon atoms. In another embodiment, D may be derived from an aromatic dihydroxy compound of Formula (XXVII)

wherein each $R^f$ is independently a halogen atom, or an aliphatic functionality having 1 to 10 carbon atoms, and "g" is an integer having a value of 0, 1, 2, 3, or 4. Examples of compounds that may be represented by the Formula (XXVII) include, but are not limited to resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing compounds.

In one embodiment T is a divalent functionality derived from a dicarboxylic acid compound of Formula (XXII)

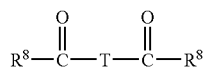

wherein $R^8$ is independently at each occurrence hydroxy, chloro, or $OR^9$, wherein $R^9$ is independently at each occurrence selected from the group consisting of an aliphatic functionality having 1 to 10 carbons, a cycloaliphatic functionality having 3 to 10 carbons, and an aromatic functionality having 6 to 10 carbons. In one embodiment the divalent functionality T comprises a cycloaliphatic functionality having 6 to 10 carbon atoms, an aromatic functionality having 6 to 20 carbon atoms, or an aliphatic functionality having 2 to 10 carbon atoms.

Examples of aromatic dicarboxylic acids that may be used to prepare the polyesters include, but are not limited to 1,6-hexanedioic acid, phthalic acid, isophthalic acid, terephthalic acid, fumaric acid, maleic acid, azelaic acid, glutaric acid, adipic acid, suberic acid, sebacic acid, malonic acid, succinic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, or 1,5- or 2,6-naphthalenedicarboxylic acids. Specific dicarboxylic acids are terephthalic acid, isophthalic acid, naphthalene dicarboxylic acid, cyclohexane dicarboxylic acid, or mixtures thereof. A specific dicarboxylic acid comprises a mixture of isophthalic acid and terephthalic acid wherein the weight ratio of terephthalic acid to isophthalic acid is about 0.2:9.8 to about 10:1. In another specific embodiment, D is an alkylene functionality having 2 to 6 carbon atoms, and T is p-phenylene, m-phenylene, naphthalene, a divalent cycloaliphatic functionality, or a mixture thereof. This class of polyester includes the poly(alkylene terephthalates).

"Copolyester-polycarbonate" or "copolyestercarbonate" or "polyester carbonate" as used herein are copolymers containing recurring carbonate units of Formula (XI) in addition to the repeating units of Formula (XII) as defined above. In one embodiment either repeating carbonate units of Formula (XI) or repeating units of Formula (XII) or repeating units of both Formula (XI) and Formula (XII) comprise structural units derived from the polycyclic dihydroxy compound of Formula (I).

"Polyurethanes" as used herein are polymers containing recurring units having Formula (XIII)

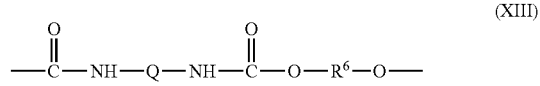

wherein $R^6$ is a divalent functionality derived from a dihydroxy compound, and may be, for example, a cycloaliphatic functionality having 6 to 10 carbon atoms, an aromatic functionality having 6 to 20 carbon atoms, or an aliphatic functionality having 2 to 10 carbon atoms; wherein at least two of $R^6$ are each independently structural units derived from a polycyclic dihydroxy compound of Formula (I); and wherein "Q" is a divalent functionality derived from a diisocyanate compound, having Formula (XIV)

wherein Q comprises a divalent aliphatic radical having 2 to 28 carbons, a divalent cycloaliphatic radical having 4 to 15 carbons, or a divalent aromatic radical having 6 to 15 carbons.

In one embodiment, $R^6$ comprises an aliphatic functionality having 2 to 10 carbon atoms. In another embodiment, $R^6$ may be derived from an aromatic dihydroxy compound of Formula (XXVII)

wherein $R^f$ and "g" have the same meaning as defined above. The examples of compounds that may be represented by the Formula (XXVII) are also the same as those described above. In one other embodiment $R^6$ may be derived from dihydroxy compounds selected from the group consisting of but not limited to, polyesterpolyol, polyetherpolyol, polybutadiene polyol, hydrogenated polybutadiene polyol, polybutadiene diol, polypropylene glycol, polyethylene glycol, 2,4-petanediol and 3-methyl-1,3-butanediol, 1,4-butenediol, and 1,4-butanediol.

Epoxide-containing polymer as used herein are polymers having the structure of Formula (XV)

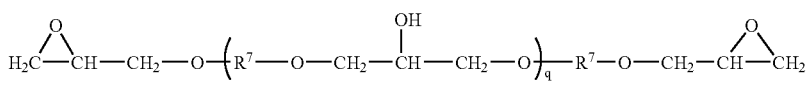

wherein R⁷ is a divalent functionality derived from a dihydroxy compound; wherein at least two of R⁷ are each structural units derived from a dihydroxy compound of Formula (I); and wherein "q" is 2 to about 20.

One embodiment is a polymer comprising structural units derived from a polycyclic dihydroxy compound of Formula (X)

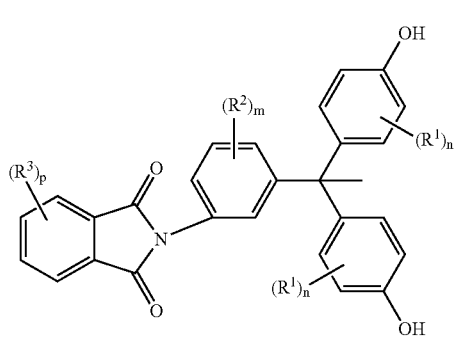

wherein $R^1$, $R^2$ and $R^3$ are independently at each occurrence selected from the group consisting of a cyano functionality, a halogen, an aliphatic functionality having 1 to 10 carbons, a cycloaliphatic functionality having 3 to 10 carbons, and an aromatic functionality having 6 to 10 carbons; and wherein each occurrence of "n", "m", and "p" independently has a value of 0, 1, 2, 3, or 4.

The polymer described above may be a homopolymer containing structural units derived from a single polycyclic dihydroxy compound represented by Formula (I), or a copolymer comprising structural units derived from two or more of the polycyclic dihydroxy compound represented by Formula (I), or a copolymer comprising structural units derived from one or more polycyclic dihydroxy compound represented by Formula (I) and structural units derived from other dihydroxy compounds. Accordingly, in one embodiment the polymer may comprise 5 mole percent to about 100 mole percent of R⁵ units derived from a polycyclic dihydroxy compound of Formula (I). Within this range the amount may be greater than or equal to about 10 mole percent. Also within this range the amount may be less than or equal to about 80 mole percent, or, more specifically, less than or equal to about 50 mole percent.

In one embodiment the dihydroxy compounds that may be useful in forming the copolymer with the polycyclic dihydroxy compound of Formula (I) may be represented by Formula (XXVIII)

HO—R¹⁰—OH                                    (XXVIII)

wherein R¹⁰ includes a functionality of Formula (XXIX),

-A¹—Y¹-A²-                                   (XXIX)

and wherein Y¹, A¹ and A² have the same meaning as defined above. In another embodiment the dihydroxy compound includes bisphenol compounds of general Formula (XXX)

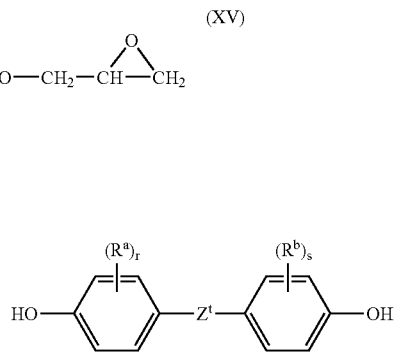

wherein $R^a$ and $R^b$ each represent a halogen atom or an aliphatic functionality having 1 to 10 carbon atoms and may be the same or different; r and s are each independently integers of 0, 1, 2, 3, or 4; and $Z^t$ represents one of the groups of Formula (XXXI)

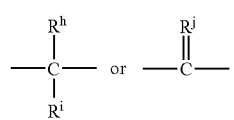

wherein $R^h$ and $R^i$ each independently represent a hydrogen atom or an aliphatic functionality having 1 to 10 carbon atoms or a cycloaliphatic functionality having 3 to 10 carbon atoms, and $R^j$ is a divalent aliphatic functionality having 1 to 10 carbon atoms.

Some illustrative, non-limiting examples of suitable dihydroxy compounds that may be used in combination with the polycyclic dihydroxy compound of Formula (I) include, but are not limited to the following: resorcinol, 4-bromoresorcinol, hydroquinone, methyl hydroquinone, 1,1-bis-(4-hydroxy-3-methylphenyl)cyclohexane, 2-phenyl-3,3-bis(4-hydroxyphenyl)phthalimidine, eugenol siloxane bisphenol, 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'- dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, as well as combinations comprising at least one of the foregoing dihydroxy compounds.

Specific examples of the types of bisphenol compounds may include, but are not limited to 1,1-bis(4-hydroxyphenyl) methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl) octane, 1,1-bis(4-hydroxyphenyl)propane, 1,1-bis(4-hydroxyphenyl)n-butane, 2,2-bis(4-hydroxy-1-methylphenyl)propane, and 1,1-bis(4-hydroxy-t-butylphenyl)propane. Combinations comprising at least one of the foregoing dihydroxy compounds may also be used. In one embodiment the bisphenol compound employed is bisphenol A.

In one specific embodiment, the polymer is a substantially linear polycarbonate derived from polycyclic dihydroxy compounds of Formula (I) or a copolymer comprising repeating units derived from polycyclic dihydroxy compounds of Formula (I) and repeating units derived from bisphenol A. In one embodiment the polycarbonate may have a refractive index of about 1.60 to about 1.63. Within this range, the refractive index may be greater than or equal to 1.603, or greater than or equal to 1.61. Also within this range, the refractive index may be up to about 1.62. In one embodiment the polycarbonate may have a $T_g$ of about 155° C. to about 250° C. Within this range, $T_g$ may be greater than or equal to 170° C., or greater than or equal to 180° C., or greater than or equal to 190° C. Also within this range, the $T_g$ may be up to about 200° C. The polycarbonates may have a weight average molecular weight of about 10,000 atomic mass units to about 250,000 atomic mass units, as measured by gel permeation chromatography. Within this range, the weight average molecular weight may be at least about 20,000 atomic mass units, or at least about 30,000 atomic mass units. Also within this range, the weight average molecular weight may be up to about 200,000 atomic mass units, or up to about 170,000 atomic mass units.

Suitable polycarbonates, polyesters and copolyester-carbonates may be manufactured by processes such as interfacial polymerization and melt polymerization. Although the reaction conditions for interfacial polymerization may vary, an exemplary process generally involves dissolving or dispersing a dihydric phenol reactant in aqueous sodium hydroxide or potassium hydroxide, adding the resulting mixture to a suitable water-immiscible solvent medium, and contacting the reactants with a carbonate precursor in the presence of a suitable catalyst such as triethylamine or a phase transfer catalyst, under controlled pH conditions, for example, about 8 to about 10. The most commonly used water immiscible solvents include, but are not limited to methylene chloride, 1,2-dichloroethane, chlorobenzene, and toluene. Suitable carbonate precursors include, for example, a carbonyl halide such as carbonyl bromide or carbonyl chloride, or a haloformate such as a bishaloformate of a dihydric phenol (for example, the bischloroformates of bisphenol A, hydroquinone, or the like) or a glycol (for example, the bishaloformate of ethylene glycol, neopentyl glycol, polyethylene glycol, or the like) or esters (for example, bis(methyl salicyl) carbonate (bMSC; Chemical Abstracts Registry No. 82091-12-1)) or diphenyl carbonate (DPC). Combinations comprising at least one of the foregoing types of carbonate precursors may also be used. The resultant polymers may have a weight average molecular weight (Mw) of about 10,000 atomic mass units to about 250,000 atomic mass units. Within this range, the weight average molecular weight may be at least about 20,000 atomic mass units, or at least about 30,000 atomic mass units. Also within this range, the weight average molecular weight may be up to about 200,000 atomic mass units, or up to about 170,000 atomic mass units.

A chain stopper (also referred to as a capping agent) may be included during polymerization. The chain-stopper limits molecular weight growth rate, and so controls molecular weight in the polycarbonate. A chain-stopper may be at least one of mono-phenolic compounds, mono-carboxylic acid chlorides, and mono-chloroformates.

For example, mono-phenolic compounds suitable as chain stoppers include monocyclic phenols, such as phenol, $C_1$-$C_{22}$ alkyl-substituted phenols, p-cumyl-phenol, p-tertiary-butyl phenol, hydroxy diphenyl; and monoethers of diphenols, such as p-methoxyphenol. Alkyl-substituted phenols include those with branched chain alkyl substituents having 8 to 9 carbon atoms. A mono-phenolic UV absorber may be used as a capping agent. Such compounds include 4-substituted-2-hydroxybenzophenones and their derivatives, aryl salicylates, monoesters of diphenols such as resorcinol monobenzoate, 2-(2-hydroxyaryl)-benzotriazoles and their derivatives, and 2-(2-hydroxyaryl)-1,3,5-triazines, and their derivatives. Specifically, mono-phenolic chain-stoppers include phenol, p-cumylphenol, and resorcinol monobenzoate.

Mono-carboxylic acid chlorides may also be suitable as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and mixtures thereof; polycyclic, mono-carboxylic acid chlorides such as trimellitic anhydride chloride, and naphthoyl chloride; and mixtures of monocyclic and polycyclic mono-carboxylic acid chlorides. Chlorides of aliphatic monocarboxylic acids with up to 22 carbon atoms are suitable. Functionalized chlorides of aliphatic monocarboxylic acids, such as acryloyl chloride and methacryoyl chloride, are also suitable. Also suitable are mono-chloroformates including monocyclic, mono-chloroformates, such as phenyl chloroformate, alkyl-substituted phenyl chloroformate, p-cumyl phenyl chloroformate, toluene chloroformate, and mixtures thereof.

Among the phase transfer catalysts that may be used are catalysts of the Formula $(R^u)_4Y^+X$, wherein each $R^u$ is the same or different, and is an alkyl group having 1 to 10 carbon atoms; Y is a nitrogen or phosphorus atom; and X is a halogen atom or an aliphatic functionality having 1 to 8 carbon atoms or aromatic functionality having 6 to 188 carbon atoms. Suitable phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is chloride, bromide$^-$, an aliphatic functionality having 1 to 8 carbon atoms or aromatic functionality having 6 to 188 carbon atoms. An effective amount of a phase transfer catalyst may be about 0.1 to about 10 wt. percent based on the weight of bisphenol in the reaction mixture. In another embodiment an effective amount of phase transfer catalyst may be about 0.5 to about 2 wt. percent based on the weight of bisphenol in the phosgenation mixture.

Alternatively, melt processes may be used to make the polycarbonates. Generally, in the melt polymerization process, polycarbonates may be prepared by co-reacting, in a molten state, the dihydroxy reactant(s) and a diaryl carbonate ester, such as diphenylcarbonate, bis(methyl salicyl)carbonate, or a combination thereof, in the presence of a transesterification catalyst in a Banbury® mixer, twin-screw extruder, or the like to form a uniform dispersion. Volatile monohydric phenol is removed from the molten reactants by distillation and the polymer is isolated as a molten residue.

The transesterification catalysts capable of effecting reaction between the diaryl carbonate ester and the polycyclic dihydroxy compound may comprise a single compound or a mixture of compounds and may be employed in combination with one or more co-catalysts such as quaternary ammonium salts or quaternary phosphonium salts. Suitable transesterification catalysts include, but are not limited to, alkali metal hydroxides, for example, lithium hydroxide, sodium hydroxide, potassium hydroxide, and mixtures thereof; alkaline earth metal hydroxides, for example, calcium hydroxide, barium hydroxide, and mixtures thereof; alkali metal salts of carboxylic acids, for example, lithium acetate, sodium benzoate, and dipotassium dodecanedioate; alkaline earth metal salts of carboxylic acids, for example, calcium benzoate, calcium adipate, and barium acetate; salts of a polycarboxylic acid, for example, tetrasodium ethylenediamine tetracarboxylate and disodium magnesium ethylenediamine tetracarboxylate; and salts of non-volatile acids, for example, alkaline earth metal salts of phosphates, alkali metal salts of phosphates, alkaline earth metal salts of phosphates, alkali metal salts of sulfates, alkaline earth metal salts of sulfates, alkali metal salts of metal oxo acids, and alkaline earth metal salts of metal oxo acids. Specific examples of salts of non-volatile acids include $NaH_2PO_3$, $NaH_2PO_4$, $Na_2HPO_3$, $KH_2PO_4$, $CsH_2PO_3$, $CsH_2PO_4$, $Cs_2HPO_4$, $Na_2SO_4$, $NaHSO_4$, $NaSbO_3$, $LiSbO_3$, $KSbO_3$, $Mg(SbO_3)_2$, $Na_2GeO_3$, $K_2GeO_3$, $Li_2GeO_3$, $MgGeO_3$, $Mg_2GeO_4$, and mixtures thereof. As used herein the term "non-volatile acid" means that the acid from which the catalyst is made has no appreciable vapor pressure under melt polymerization conditions. Examples of non-volatile acids include phosphorous acid, phosphoric acid, sulfuric acid, and metal "oxo acids" such as the oxo acids of germanium, antimony, niobium, and the like.

As mentioned, melt polymerization may be practiced using a co-catalyst. Typically, the co-catalyst is a quaternary ammonium salt or quaternary phosphonium salt and is used in an amount corresponding to about 10 to about 250 times the molar amount of melt polymerization catalyst used. The catalyst and co-catalyst may be added to the reaction mixture either simultaneously, or the catalyst and co-catalyst may be added separately at different stages of the polymerization reaction.

The copolyester-polycarbonate resins may also be prepared by interfacial polymerization. Rather than utilizing the dicarboxylic acid per se, it is possible to employ the reactive derivatives of the acid, such as the corresponding acid halides, in particular the acid dichlorides and the acid dibromides. Thus, for example instead of using isophthalic acid, terephthalic acid, or mixtures thereof, it is possible to employ isophthaloyl dichloride, terephthaloyl dichloride, and mixtures thereof.

When activated carbonate precursors (i.e., carbonate precursors that react faster than diphenyl carbonate) such as bMSC are used to make the polycarbonate, polyester and copolycarbonate polymers described herein the polymers can comprise certain physical differences compared to similar polymers prepared using other melt or interfacial methods. For example, such polymers typically contain some type of internal methyl salicylate "kink" structures such as shown below, and a certain amount of endcap structures indicative of the use of bMSC as shown in units represented by Formula (XVI), Formula (XVII) and Formula (XVIII)

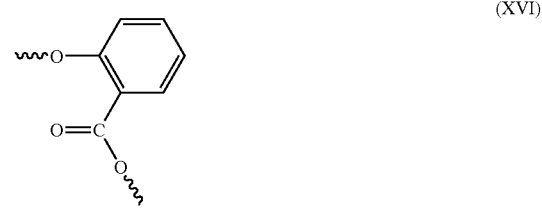

(XVI)

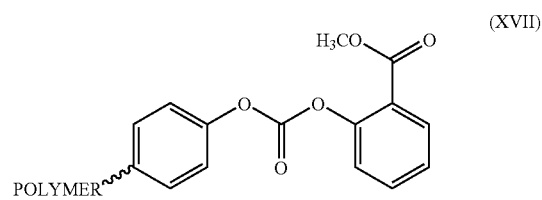

(XVII)

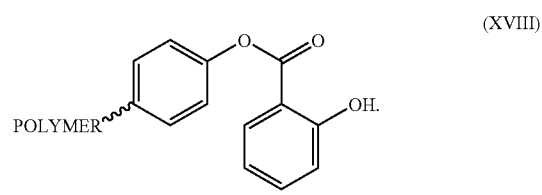

(XVIII)

The polyurethanes may be prepared by reacting a dihydroxy compound of Formula (I) with a diisocyanate compound having Formula (XIV)

$$Q(NCO)_2 \qquad (XIV)$$

wherein Q comprises a divalent aliphatic radical having 2 to 28 carbons, a divalent cycloaliphatic radical having 4 to 15 carbons, or a divalent aromatic radical having 6 to 15 carbons.

Suitable examples of diisocyanate include but are not limited to, toluene-2,4-diisocyanate, 1,6-hexamethylene diisocyanate, 4,4'-diphenyl methane diisocyanate, 2,4'-diphenyl methane diisocyanate, 1,3-phenylene diisocyanate, 1,4-phenylene diisocyanate, toluene-2,6-diisocyanate, cyclohexane diisocyanate, isophorone diisocyanate and combinations of two or more of the foregoing diisocyanate compounds.

Suitable examples of catalysts that may be employed in the reaction of the dihydroxy compound with the diisocyanate include, but are not limited to 1,4-diazabicyclo[2.2.2]octane (DABCO), triethylamine, triphenylamine, dibutyltindilaurate and stannous chloride.

Suitable examples of solvents that may be employed in the reaction of the dihydroxy compound with the diisocyanate include, but are not limited to tetrahydrofuran, dimethylformamide, dimethylacetamide, dimethylsulfoxide, trichlorobenzenes, and dichlorobenzenes.

The epoxide containing polymers can be prepared by reacting a dihydroxy compound of Formula (I) with epichlorohydrin to form a diglycidyl ether compound of Formula (XXXII)

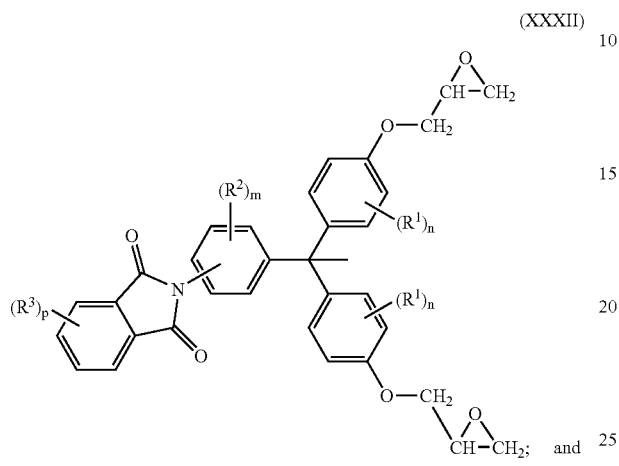

polymerizing the diglycidyl ether compound having Formula (XXXII) to provide the epoxide-containing polymer having Formula (XV)

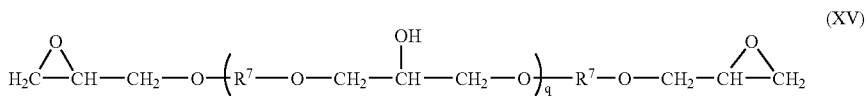

wherein $R^7$ is a divalent functionality derived from a dihydroxy compound; wherein at least two of $R^7$ are each structural units derived from a polycyclic dihydroxy compound of Formula (I); wherein "q" is 2 to about 20 and wherein $R^1$, $R^2$, $R^3$, "n", "m" and "p" have the same meaning as defined above.

Epoxide-containing polymers may typically be prepared following the two steps described below. The first step is the synthesis of a diepoxy prepolymer resin, and the second step is crosslinking with a diamine. The diepoxy prepolymer resin may be synthesized through condensation of a bisphenol and epichlorohydrin in the presence of a suitable base, water and a solvent.

Suitable bases that can be employed for the preparation of the epoxide-containing polymer include, but are not limited to, triethylamine, piperidine, pyridine, and combinations of the foregoing bases.

Suitable solvents that can be employed for the preparation of the epoxide-containing polymer include, but are not limited to, toluene, xylene, tetrahydrofuran, dimethylformamide, dimethylacetamide, dimethylsulfoxide, trichlorobenzenes, and dichlorobenzenes.

In one embodiment a substantially linear polycarbonate comprises at least two structural units derived from a polycyclic dihydroxy compound of Formula (XIX) or Formula (X)

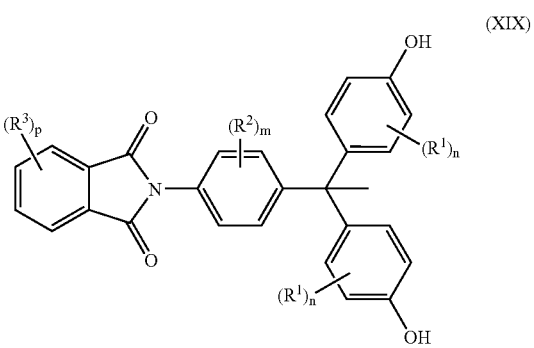

-continued

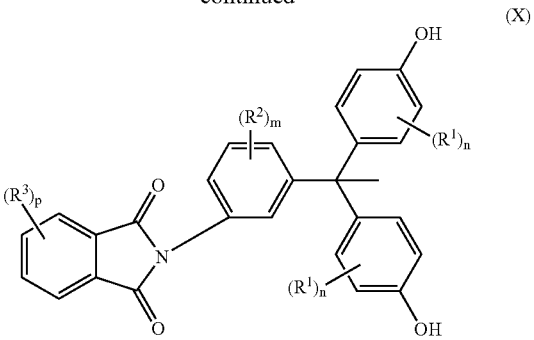

wherein $R^1$, $R^2$ and $R^3$ are independently at each occurrence selected from the group consisting of a cyano functionality, a halogen, an aliphatic functionality having 1 to 10 carbons, a cycloaliphatic functionality having 3 to 10 carbons, and an aromatic functionality having 6 to 10 carbons; and wherein each occurrence of "n", "m", and "p" independently has a value of 0, 1, 2, 3, or 4. It will be understood that the phrase "at least two structural units derived from a polycyclic dihydroxy compound of Formula (XIX) or Formula (X)" includes embodiments in which the polycarbonate comprises at least one structural unit derived from a polycyclic dihydroxy compound of Formula (XIX) and at least one structural unit derived from a polycyclic dihydroxy compound of Formula (X).

In one embodiment a substantially linear polycarbonate comprises structural units derived from a polycyclic dihydroxy compound of Formula (XX) or Formula (XXI)

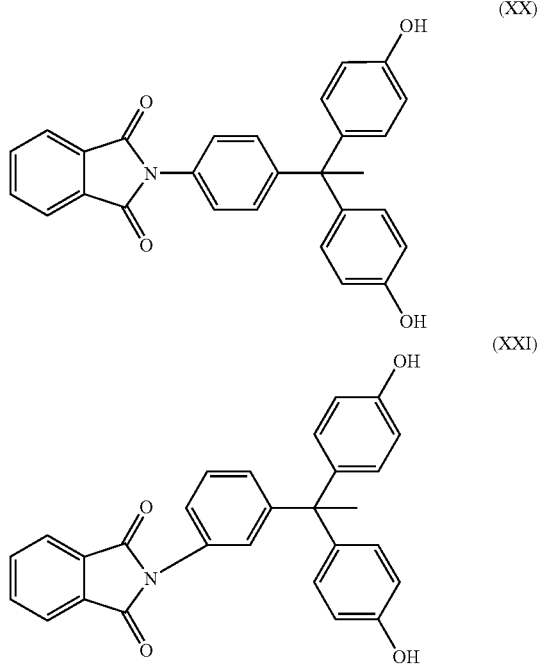

wherein the substantially linear polycarbonate comprises about 10 to about 50 mole percent of repeating units derived from the polycyclic dihydroxy compound of Formula (XX) or Formula (XXI) or a mixture of the two, and about 50 to about 90 mole percent of repeating units derived from bisphenol A.

In addition to the polymers described above, it is also possible to use combinations of the polymer with other thermoplastic polymers, for example combinations of polycarbonates and/or polycarbonate copolymers with polyamides, polyesters, other polycarbonates; copolyester-polycarbonates, olefin polymers such as ABS, polystyrene, polyethylene; polysiloxanes, polysilanes and polysulfones. As used herein, a "combination" of polymers is inclusive of all mixtures, blends, and alloys. In certain embodiments the one or more additional resins may be present preferably in an amount less than or equal to 40 weight percent, more preferably less than or equal to 35 weight percent and most preferably less than or equal to about 30 weight percent, based on the total weight of the polymer composition.

In addition to the polycarbonate resin, the thermoplastic composition may include various additives ordinarily incorporated in resin compositions of this type, with the proviso that the additives are preferably selected so as to not significantly adversely affect the desired properties of the thermoplastic composition. Mixtures of additives may be used. Such additives may be mixed at a suitable time during the mixing of the components for forming the composition.

Exemplary additives include such materials as fillers or reinforcing agents, thermal stabilizers, radiation stabilizers, antioxidants, light stabilizers, UV stabilizers, plasticizers, visual effect enhancers, extenders, antistatic agents, catalyst quenchers, mold release agents, flame retardants, infrared shielding agents, whitening agents, blowing agents, anti-drip agents, impact modifiers and processing aids. The different additives that can be incorporated in the polymer compositions of the present invention are typically commonly used and known to those skilled in the art.

Suitable fillers or reinforcing agents include, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

The fillers and reinforcing agents may be coated with a layer of metallic material to facilitate conductivity, or surface treated with silanes to improve adhesion and dispersion with the polymeric matrix resin. In addition, the reinforcing fillers may be provided in the form of monofilament or multifilament fibers and may be used either alone or in combination with other types of fiber, through, for example, co-weaving or core/sheath, side-by-side, orange-type or matrix and fibril constructions, or by other methods known to one skilled in the art of fiber manufacture. Suitable cowoven structures include, for example, glass fiber-carbon fiber, carbon fiber-aromatic polyimide(aramid) fiber, and aromatic polyimide fiberglass fiber or the like. Fibrous fillers may be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids.

Suitable thermal stabilizer additives include, for example, organophosphites such as triphenyl phosphite, tris-(2,6-dimethylphenyl)phosphite, tris-(mixed mono-and di-nonylphenyl)phosphite or the like; phosphonates such as dimethylbenzene phosphonate or the like, phosphates such as trimethyl phosphate, or the like, or combinations comprising at least one of the foregoing heat stabilizers.

Non-limiting examples of antioxidants that can be used in the polymer compositions of the present invention include tris(2,4-di-tert-butylphenyl)phosphite; 3,9-di(2,4-di-tert-butylphenoxy)-2,4,8,10-tetraoxa-3,9-diphosphaspiro[5.5]undecane; 3,9-di(2,4-dicumylphenoxy)-2,4,8,10-tetraoxa-3,9-diphosphaspiro[5.5]undecane; tris(p-nonylphenyl) phosphite; 2,2',2"-nitrilo[triethyl-tris[3,3',5,5'-tetra-tertbutyl-1,1'-biphenyl-2'-diyl]phosphite]; 3,9-distearyloxy-2,4,8,10-tetraoxa-3,9-diphosphaspiro[5.5]undecane; dilauryl phosphite; 3,9-di[2,6-di-tert-butyl-4-methylphenoxy]-2,4,8,10-tetraoxa-3,9-diphosphaspiro[5.5]undecane; tetrakis(2,4-di-tert-butylphenyl)-4,4'-bis(diphenylene)phosphonite; distearyl pentaerythritol diphosphite; diisodecyl pentaerythritol diphosphite; 2,4,6-tri-tert-butylphenyl-2-butyl-2-ethyl-1,3-propanediol phosphite; tristearyl sorbitol triphosphite; tetrakis(2,4-di-tert-butylphenyl)-4,4'-biphenylene diphosphonite; (2,4,6-tri-tert-butylphenyl)-2-butyl-2-ethyl-1,3-propanediolphosphite; triisodecylphosphite; and mixtures of phosphites containing at least one of the foregoing.

Non-limiting examples of UV stabilizers that can be used include 2-(2'-hydroxyphenyl)-benzotriazoles, for example, the 5'-methyl-; 3',5'-di-tert.-butyl-; 5'-tert.-butyl-; 5'-(1,1,3,3-tetramethylbutyl)-; 5-chloro-3',5'-di-tert.-butyl-; 5-chloro-3'-tert.-butyl-5'-methyl-; 3'-sec.-butyl-5'-tert.-butyl-; 3'-alpha-methylbenzyl-5'-methyl; 3'-alpha-methylbenzyl-5'-methyl-5-chloro-; 4'-hydroxy-; 4'-methoxy-; 4'-octoxy-; 3',5'-di-tert.-amyl-; 3'-methyl-5'-carbomethoxyethyl-; 5-chloro-3',5'-di-tert.-amyl-derivatives; and Tinuvin® 234 (available from Ciba Specialty Chemicals). Also suitable are the 2,4-bis-(2'-hydroxyphenyl)-6-alkyl-s-triazines, for example, the 6-ethyl-; 6-heptadecyl- or 6-undecyl-derivatives. 2-Hydroxy-benzophenones for example, the 4-hydroxy-, 4-methoxy-, 4-octoxy-, 4-decyloxy-, 4-dodecyloxy-, 4-benzyloxy-, 4,2', 4'-trihydroxy-, 2,2',4,4'-tetrahydroxy-, or 2'-hydroxy-4,4'-dimethoxy derivatives. 1,3-bis-(2'-hydroxybenzoyl)-benzenes, for example, 1,3-bis-(2'-hydroxy-4'-hexyloxybenzoyl)-benzene; 1,3-bis-(2'-hydroxy-4'-octyloxy-benzoyl)-benzene or 1,3-bis-(2'-hydroxy-4'-dodecyloxybenzoyl)-benzene may also be employed. Esters of optionally substituted benzoic acids, for example, phenylsalicylate; octylphenylsalicylate; dibenzoylresorcin; bis-(4-tert.-butylbenzoyl)-resorcin; benzoylresorcin; 3,5-di-tert.-butyl-4-hydroxybenzoic acid-2,4-di-tert.-butylphenyl ester or -octadecyl ester or -2-methyl-4,6-di-tert.-butyl ester may likewise be employed. Acrylates, for example, alpha-cyano-beta, beta-diphenylacrylic acid-ethyl ester or isooctyl ester, alpha-carbomethoxy-cinnamic acid methyl ester, alpha-cyano-beta-methyl-p-methoxy-cinnamic acid methyl ester or -butyl ester or N(beta-carbomethoxyvinyl)-2-methyl-indoline may likewise be employed. Oxalic acid diamides, for example, 4,4'-di-octyloxy-oxanilide; 2,2'-di-octyloxy-5,5'-di-tert.-butyl-oxanilide; 2,2'-di-dodecyloxy-5,5-di-tert.-butyl-oxanilide; 2-ethoxy-2'-ethyl-oxanilide; N,N'-bis-(3-dimethyl-aminopropyl)-oxalamide; 2-ethoxy-5-tert.-butyl-2'-ethyloxanilide and the mixture thereof with 2-ethoxy-2'-ethyl-5,4'-di-tert.-butyl-oxanilide; or mixtures of ortho- and para-methoxy- as well as of o- and p-ethoxy-disubstituted oxanilides are also suitable as UV stabilizers. Preferably the ultraviolet light absorber used in the instant compositions is 2-(2-hydroxy-5-methylphenyl)-2H-benzotriazole; 2-(2-hydroxy-3,5-di-tert-amylphenyl)-2H-benzotriazole; 2-[2-hydroxy-3,5-di-(alpha,alpha-dimethylbenzyl)phenyl]-2H-benzotriazole; 2-(2-hydroxy-5-tert-octylphenyl)-2H-benzotriazole; 2-hydroxy-4-octyloxybenzophenone; nickel bis(O-ethyl 3,5-di-tert-butyl-4-hydroxybenzylphosphonate); 2,4-dihydroxybenzophenone; 2-(2-hydroxy-3-tert-butyl-5-methylphenyl)-2H-benzotriazole; nickel butylamine complex with 2,2'-thiobis(4-tert-butylphenol); 2-ethoxy-2'-ethyloxanilide; 2-ethoxy-2'-ethyl-5,5'-ditert-butyloxanilide or a mixture thereof.

Plasticizers, lubricants, and/or mold release agents additives may also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl)phosphate of hydroquinone and the bis(diphenyl)phosphate of bisphenol-A; poly-alpha-olefins; epoxidized soybean oil; silicones, including silicone oils; esters, for example, fatty acid esters such as alkyl stearyl esters, for example, methyl stearate; stearyl stearate and pentaerythritol tetrastearate. mixtures of methyl stearate and hydrophilic and hydrophobic nonionic surfactants comprising polyethylene glycol polymers, polypropylene glycol polymers, and copolymers thereof, for example, methyl stearate and polyethylene-polypropylene glycol copolymers in a suitable solvent; waxes such as beeswax, montan wax, paraffin wax or the like.

Visual effect enhancers, sometimes known as visual effects additives or pigments may be present in an encapsulated form, a non-encapsulated form, or laminated to a particle comprising polymeric resin. Some non-limiting examples of visual effects additives are aluminum, gold, silver, copper, nickel, titanium, stainless steel, nickel sulfide, cobalt sulfide, manganese sulfide, metal oxides, white mica, black mica, pearl mica, synthetic mica, mica coated with titanium dioxide, metal-coated glass flakes, and colorants, including but not limited, to Perylene Red. The visual effect additive may have a high or low aspect ratio and may comprise greater than 1 facet. Dyes may be employed such as Solvent Blue 35, Solvent Blue 36, Disperse Violet 26, Solvent Green 3, Anaplast Orange LFP, Perylene Red, and Morplas Red 36. Fluorescent dyes may also be employed including, but not limited to, Permanent Pink R (Color Index Pigment Red 181, from Clariant Corporation), Hostasol Red 5B (Color Index #73300, Chemical Abstracts Registry No. 522-75-8, from Clariant Corporation) and Macrolex Fluorescent Yellow 10GN (Color Index Solvent Yellow 160:1, from Bayer Corporation). Pigments such as titanium dioxide, zinc sulfide, carbon black, cobalt chromate, cobalt titanate, cadmium sulfides, iron oxide, sodium aluminum sulfosilicate, sodium sulfosilicate, chrome antimony titanium rutile, nickel antimony titanium rutile, and zinc oxide may be employed. Visual effect additives in encapsulated form usually comprise a visual effect material such as a high aspect ratio material like aluminum flakes encapsulated by a polymer. The encapsulated visual effect additive has the shape of a bead.

The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents include certain polyesteramides, polyether-polyamide(polyetheramide) block copolymers, polyetheresteramide block copolymers, polyetheresters, or polyurethanes, each containing polyalkylene oxide units that may be polyalkylene glycol functionality, for example, polyethylene glycol, polypropylene glycol and polytetramethylene glycol. Such polymeric antistatic agents are commercially available, such as, for example, Pelestat® 6321 (Sanyo), Pebax® H1657 (Atofina), and Irgastat® P18 and P22 (Ciba-Geigy). Other polymeric materials that may be used as antistatic agents are inherently conducting polymers such as polyaniline (commercially available as PANIPOL®EB from Panipol), polypyrrole and polythiophene (commercially available from Bayer), which retain some of their intrinsic conductivity after melt processing at elevated temperatures. In one embodiment, carbon fibers, carbon nanofibers, carbon nanotubes, carbon black, or any combination of the foregoing may be used in a polymeric resin containing chemical antistatic agents to render the composition electrostatically dissipative.

Non-limiting examples of mold release compositions include esters of long-chain aliphatic acids and alcohols such as pentaerythritol, guerbet alcohols, long-chain ketones, siloxanes, alpha-olefin polymers, long-chain alkanes and hydrocarbons having 15 to 600 carbon atoms.

Non-limiting examples of flame retardants that can be used include potassium diphenylsulfone sulfonate, perfluoroalkane sulfonates and phosphite esters of polyhydric phenols, such as resorcinol and bisphenol A.

The thermoplastic composition may optionally comprise an impact modifier. The impact modifier resin added to the thermoplastic composition in an amount corresponding to about 1 percent to about 30 percent by weight, based on the total weight of the composition. Suitable impact modifiers include those comprising one of several different rubbery modifiers such as graft or core shell rubbers or combinations of two or more of these modifiers. Impact modifiers are illustrated by acrylic rubber, ASA rubber, diene rubber, organosiloxane rubber, ethylene propylene diene monomer (EPDM) rubber, styrene-butadiene-styrene (SBS) rubber, styrene-(ethylene-butylene)-styrene (SEBS) rubber, acrylonitrile-butadiene-styrene (ABS) rubber, methacrylate-butadiene-styrene (MBS) rubber, styrene acrylonitrile copolymer, and glycidyl ester impact modifier.

Non-limiting examples of processing aids that can be used include Doverlube® FL-599 (available from Dover Chemical Corporation), Polyoxyter® (available from Polychem Alloy Inc.), Glycolube® P (available from Lonza Chemical Company), pentaerythritol tetrastearate, Metablen® A-3000 (available from Mitsubishi Rayon), and neopentyl glycol dibenzoate.

Radiation stabilizers may also be present in the thermoplastic composition, specifically gamma-radiation stabilizers. Suitable gamma-radiation stabilizers include diols, such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol and 1,4-hexandiol; alicyclic alcohols such as 1,2-cyclopentanediol and 1,2-cyclohexanediol; branched acyclic diols such as 2,3-dimethyl-2,3-butanediol (pinacol), and polyols, as well as alkoxy-substituted cyclic or acyclic alkanes. Alkenols, with sites of unsaturation, are also a useful class of alcohols, examples of which include 4-methyl-4-penten-2-ol, 3-methyl-pentene-3-ol, 2-methyl-4-penten-2-ol, 2,4-dimethyl-4-pene-2-ol, and 9-decen-1-ol. Another class of suitable alcohols is the tertiary alcohols, which have at least one hydroxy substituted tertiary carbon. Examples of these include 2-methyl-2,4-pentanediol(hexylene glycol), 2-phenyl-2-butanol, 3-hydroxy-3-methyl-2-butanone and 2-phenyl-2-butanol., and cycoloaliphatic tertiary carbons such as 1-hydroxy-1-methyl-cyclohexane. Another class of suitable alcohols is hydroxymethyl aromatics, which have hydroxy substitution on a saturated carbon attached to an unsaturated carbon in an aromatic ring. The hydroxy substituted saturated carbon may be a methylol group (—$CH_2OH$) or it may be a member of a more complex hydrocarbon group such as would be the case with (—$CR^4HOH$) or (—$CR^4_2OH$) wherein $R^4$ is a complex or simple hydrocarbon. Specific hydroxy methyl aromatics may be benzhydrol, 1,3-benzenedimethanol, benzyl alcohol, 4-benzyloxy benzyl alcohol and benzyl benzyl alcohol. Specific alcohols are 2-methyl-2,4-pentanediol (also known as hexylene glycol), polyethylene glycol, polypropylene glycol.

Where a foam is desired, a blowing agent may be added to the composition. Suitable blowing agents include for example, low boiling halohydrocarbons; those that generate carbon dioxide; blowing agents that are solid at room temperature and that when heated to temperatures higher than their decomposition temperature, generate gases such as nitrogen, carbon dioxide, ammonia gas or the like, such as azodicarbonamide, metal salts of azodicarbonamide, 4,4' oxybis(benzenesulfonylhydrazide), sodium bicarbonate, ammonium carbonate, or the like, or combinations comprising at least one of the foregoing blowing agents.

Anti-drip agents may also be used, for example a fibril forming or non-fibril forming fluoropolymer such as polytetrafluoroethylene (PTFE). The anti-drip agent may be encapsulated by a rigid copolymer as described above, for example styrene-acrylonitrile copolymer (SAN). PTFE encapsulated in SAN is known as TSAN. Encapsulated fluoropolymers may be made by polymerizing the encapsulating polymer in the presence of the fluoropolymer, for example an aqueous dispersion. TSAN may provide significant advantages over PTFE, in that TSAN may be more readily dispersed in the composition. A suitable TSAN may comprise, for example, about 50 wt. percent PTFE and about 50 wt. percent SAN, based on the total weight of the encapsulated fluoropolymer. The SAN may comprise, for example, about 75 wt. percent styrene and about 25 wt. percent acrylonitrile based on the total weight of the copolymer. Alternatively, the fluoropolymer may be pre-blended in some manner with a second polymer, such as for, example, an aromatic polycarbonate resin or SAN to form an agglomerated material for use as an anti-drip agent. Either method may be used to produce an encapsulated fluoropolymer.

The thermoplastic compositions may be manufactured by methods generally available in the art, for example, in one embodiment, in one manner of proceeding, powdered polymer resin and/or other optional components are first blended, in a Henschel® high speed mixer. Other low shear processes including but not limited to hand mixing may also accomplish this blending. The blend is then fed into the throat of a twin-screw extruder via a hopper. Alternatively, one or more of the components may be incorporated into the composition by feeding directly into the extruder at the throat and/or downstream through a sidestuffer. Such additives may also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate may be one-fourth inch long or less as desired. Such pellets may be used for subsequent molding, shaping, or forming.

Shaped, formed, or molded articles comprising the polymer compositions are also provided. The polycarbonate compositions may be molded into useful shaped articles by a variety of means such as injection molding, extrusion, rotational molding, blow molding and thermoforming to form articles such as, for example, computer and business machine housings such as housings for monitors, handheld electronic device housings such as housings for cell phones, electrical connectors, and components of lighting fixtures, ornaments, home appliances, roofs, greenhouses, sun rooms, swimming pool enclosures and automotive applications (e.g., forward lighting enclosures for car headlamps).

A further understanding of the techniques described above can be obtained by reference to certain specific examples that are provided herein for purposes of illustration only, and are not intended to be limiting.

EXAMPLES

High Performance Liquid Chromatography (HPLC) method was used to identity the conversion of product compound. An Xterra C18 column, length 50 millimeters, inner diameter 4.6 millimeters and thickness 5 micrometers was used for the analysis. The column temperature was maintained at 30° C. The column was eluted with 90% of water and 10% acetonitrile. The flow rate of sample in the column was maintained at 1.00 ml/min and amount of sample injected was 5 micro liters. The total run time was 30 minutes.

Proton NMR spectra for all the starting materials and products described herein were measured using a 300 megahertz Bruker NMR spectrometer using deuterated chloroform or $d_6$-dimethylsulfoxide as a solvent.

Unless indicated otherwise temperature is in degrees centigrade (° C.). The molecular weight (MWPS—weight average molecular weight based on polystyrene standards) was determined by Gel Permeation Chromatography (GPC) on a Shimadzu system, using chloroform as solvent at 35° C. through a PLgel 5 μm (10E3 Angstrom & 10E5 Angstrom) column and housed with a UV detector at 254 nanometers (nm) and compared relative to polystyrene standards. Copolycarbonate composition was determined by NMR spectroscopic analysis. The glass transition temperature ($T_g$) of the polymer was analyzed on a DSC2920 equipment from TA Instruments and the degradation analysis ($T_d$) was conducted on a TGA2950 instrument from TA Instruments.

The refractive index (RI) was measured on a compression molded sample of about 1.5 to 2 millimeters thickness using a Leica Mark II Plus Abbe Refractometer at about 25° C. and at the sodium D line wavelength. Further, the composition ($^{13}$C NMR) of the polymer was obtained from a BRUKER AVANCE 400, 400 MHz Multinuclear High Resolution NMR. Chemical resistance of the polymer was conducted by the 'Drop Test' method, where a drop of the test solvent (acetone, MEK, toluene, ethanol) was added on the compression molded sample and left for one minute. The solvent was then wiped off the polymer surface and visually inspected (qualitatively) for any defects (haziness, sticky residue) and labeled as pass/fail.

Example 1

This example provides a method for the preparation of N-4-[1,1'-di(4-hydroxyphenyl)ethyl]phenyl phthalimide (Formula (I)). The method includes three steps as described below.

STEP A: Preparation of 4-nitrophenyl-4,4'-dihydroxyphenylethane (Formula (IV)).

To a mixture of phenol (135 g (grams)) and p-nitroacetophenone (83 g; purity>98%) was added p-toluenesulfonic acid (95 g) under stirring. The reaction mixture was heated at 80 to 82° C. for 36 to 40 hours (hrs) under nitrogen atmosphere. After the reaction was completed (as observed by using thin layer chromatography), the reaction mixture was dumped into hot water (500 milliliters (ml)) and stirred well. The precipitated product was filtered and washed with hot water to remove phenol. The solid product so obtained was dissolved in sodium hydroxide solution (10 percent, 400 ml) and filtered to remove any undissolved impurities. The clear solution was neutralized with hydrochloric acid solution (1:1 volume by volume). The precipitated product was filtered, washed with water, and dried; to yield a dry product weight 102 g. The dried product was taken for the next step without further purification. $^1$H NMR: DMSO-d6: 2.04(3H, CH3), 6.58-6.91(8H, ArH), 7.21-7.36(2H, ArH), 8.07-8.22(2H, ArH), 9.37(2H, 2×OH). HPLC(r.t. area %): 14.40(92.19%), 14.763(3.26%).

STEP B: Preparation of 4-aminophenyl-4,4'-dihydroxyphenylethane (Formula (V)).

4-nitrophenyl-4,4'-dihydroxyphenylethane (60 g) was dissolved in glacial acetic acid (100 ml) and palladium-carbon catalyst (10 percent, 0.6 g) was added. The reaction mixture was heated to 35° C. and purged with hydrogen and then set the pressure at 50 psi for 6 hrs. This reaction was carried out until there is no visible consumption of hydrogen. Solvent was removed under vacuum and resulting mass was dumped into ice cold water (0 to 5° C.). The precipitate was filtered and the crude product dried. The crude product was dissolved in ethyl acetate (200 ml) and was extracted with hydrochloric acid. The hydrochloric acid extract was neutralized with ammonia, filtered and washed with water and the resultant product dried to yield 45.1 g of product. This product was taken for next step without further purification. $^1$H NMR: DMSO-d6: 1.92(3H, CH3), 4.86(2H, NH2), 6.40-6.48(2H, ArH), 6.58-6.69(6H, ArH), 6.75-6.84(4H, ArH), 9.17(2H, 2×OH). HPLC: 9.749(93.65%), 10.240(4.84%, isomer).

STEP C: Preparation of N-4-[1,1'-di(4-hydroxyphenyl)ethyl]phenyl phthalimide (Formula (I)).

A mixture of 4-amino-4,4'-dihydroxyphenylethane (75 g, 0.25 mole) and phthalic anhydride (37 g, 0.25 mole) taken in glacial acetic acid (300 ml) were heated at 80 to 85° C. for 12 hrs. After the reaction was complete, the reaction mixture was concentrated and the resultant mass was dumped into ice cold water and the precipitated product was filtered and dried to yield a crude product weighing 91.4 g. The crude product was crystallized from isopropyl alcohol. The crystallized sample was stirred at 90 to 95° C. in hot water for several hours to remove the traces of isopropyl alcohol to yield a purified product weighing 63 g. $^1$H NMR and HPLC were recorded. The peaks obtained were at δ 9.31(2H, OH), 8-7.85(4H, ArH), 7.38-7.30(2H, ArH), 7.20(2H, ArH), 6.92-6.81(4H, ArH), 6.75-6.64(4H, ArH), 2.06(3H, CH$_3$). HPLC: 98.70%

Example 2

This example provides a method for the preparation of N-3-[1,1'-di(4-hydroxyphenyl)ethyl]phenyl phthalimide (Formula (I)). The method includes 3 steps as described below.

STEP A: Preparation of 3-nitrophenyl-4,4'-dihydroxyphenylethane (Formula IV).

To a mixture of phenol (144 g) and 3-nitroacetophenone (44 g; purity>98%) was added p-toluenesulfonic acid (80 g) under stirring. The reaction mixture was heated at 80 to 82° C. for 48 hrs under nitrogen atmosphere. After the reaction was completed (as observed by thin layer chromatography), the reaction mixture was dumped into hot water (500 ml) and stirred well. The precipitated product was filtered and washed with hot water to remove unreacted phenol. The solid product so obtained was dissolved in sodium hydroxide solution (10 percent, 200 ml) and filtered to remove any undissolved impurities. The clear solution was then neutralized with hydrochloric acid solution (1:1 volume by volume). The precipitated product was then filtered, washed with water and dried to yield a product weighing 59.1 g. HPLC 97.69% and taken for next step without further purification.

STEP B: Preparation of 3-aminophenyl-4,4'-dihydroxyphenylethane (V).

3-nitrophenyl-4,4'-dihydroxyphenylethane (59.1 g) was dissolved in glacial acetic acid (100 mL) and palladium: carbon catalyst (10 percent, 0.4 g) was added. The reaction mixture was then heated to 50° C. and purged with hydrogen and the pressure was then set at 50 psi for 3 hrs. The reaction was carried out until there was no visible consumption of hydrogen. The palladium:carbon catalyst was removed by filtering through a celite bed. The filtrate was concentrated under vacuum by removing solvent and the resulting mass was dumped into ice cold water. The resultant precipitate was filtered and the crude product obtained was dried. The crude product was then dissolved in hydrochloric acid and the resultant mixture was filtered to remove the undissolved impurities. The filtrate was then neutralized with ammonia, the product filtered, washed with water and dried to yield a product weighing 32.2 g and having LC Area percent of 92.41 percent. This product was used in the next step without further purification.

STEP C: Preparation of N-3-[1,1'-di(4-hydroxyphenyl)ethyl] phenyl phthalimide (Formula (I)).

A mixture of 3-amino-4,4'-dihydroxyphenylethane (32 g) and phthalic anhydride (16 g) in glacial acetic acid (100 ml) was heated at 82° C. for 18 hrs. After the reaction was complete, the reaction mixture was concentrated by removing the solvent. The resultant mass was then dumped into ice cold water and the precipitated product was filtered and dried to obtain a crude product. The crude product was subjected to charcoal treatment and crystallized using isopropyl alcohol. The crystallized product was heated at 90 to 95° C. in hot water under acidic condition for 4 hours to remove the traces of isopropyl alcohol. The product obtained on drying weighed 29.7 g and had an LC Area percent of 99.60 percent.

As can be seen from the foregoing examples compounds having Formula (I) and Formula (X) can be readily prepared as shown in Examples 1 and 2 respectively.

Polymer Examples

The required quantity of monomers were transferred into a glass reactor tube and charged with a known amount of transesterification catalysts. The reaction mixture was purged with nitrogen, following which the polymerization was conducted in stages by varying the process parameters (temperature, pressure and residence time). The mole ratio (carbonate to diols) was varied from 1.015 to 1.03 to facilitate controlled molecular weight build-up in the polymer. The temperature in this system was varied between 180° C. to 320° C. and pressure from 1 atmosphere to 0 millibar (mbar). Copolymers of Phthalimido Bisphenol (Ph-BP) with BPA in the range of 10 to 50 (mol %) were polymerized and their properties were evaluated. Milli-Q water indicates water purified using an Ultrapure Water Purification System.

Examples 3-12

These examples provide a method of preparation of the Ph-BP/BPA copolymer (25/75 (mol %): Ph-BP/BPA)

A glass reactor tube was passivated with 0.1 N HCl overnight. The tube was then washed with deionized water a few times followed by Milli-Q water and acetone. The tube was then dried with air and used for the reaction. Bis(methyl salicyl)carbonate (bMSC; 20 g; 0.0606 moles), Phthalimido Bisphenol (Ph-BP; 6.49 g; 0.0149 moles), and BPA (10.22 g) were added to the passivated tube. Sodium hydroxide (3.53 micro grams, 0.088e-6 moles) and tetramethyl ammonium hydroxide (TMAH; 536 micro grams, 5.88 e-6 moles) were added to the reaction mixture. The mixture was then heated to 180° C. As soon as the mixture melted completely and became homogeneous, the stirring was started. The reaction was then allowed to proceed for 10 minutes. The temperature was then raised to 220° C. and the pressure was gradually decreased to 100 mbar. The melt appeared transparent but had a brown tinge to it. This could possibly be due to the starting color of Ph-BP, which was off-white. After about 15 minutes at this temperature and pressure, the temperature was raised to 310° C. and the pressure was reduced to 0 mbar where the reaction was allowed to proceed for another 10 minutes. The polymer was seen to be forming as the torque (viscosity) gradually increased. The by-product methylsalicylate was constantly removed throughout the reaction. After about 10 minutes at this condition, the reactor was brought back to atmospheric pressure (using N$_2$) and the contents were removed under gravity. The strands that were obtained were clear, transparent and golden brown in color and appeared to have built reasonably good molecular weight. The amounts of co-monomers taken and the properties of the corresponding polymers are included in Table 1 below. The "$^{13}$C NMR" column of Table 1 gives the percentage of the integrated $^{13}$C NMR resonances attributable to repeating units derived from the phthalimide-substituted monomer. The results in this column indicate that the proportion of phthalimide-substituted monomer incorporated into the polymer is roughly the same as the proportion of phthalimide-substituted monomer in the reactants.

TABLE 1

| Example | Ph-BP/BPA | Ph-BP version | MWPS | PDI | $T_g$ °C. | $T_d$ (onset) | $T_d$ (50%) | RI ($n_d$) | $^{13}C$ NMR |
|---|---|---|---|---|---|---|---|---|---|
| 3 | 10/90 | Para | 79000 | 2.4 | 157 | 394 | 460 | NA | NA |
| 4 | 25/75 | Para | 230000 | 5.6 | 178 | 383 | 473 | 1.6027 | 22.18 |
| 5 | 25/75 | Para | 69000 | 2.5 | 175 | 379 | 466 | 1.6040 | 25.34 |
| 6 | 25/75 | Meta | 162000 | 4.0 | 166 | 351 | 487 | Hazy | NA |
| 7 | 25/75 | Meta | 48000 | 2.3 | 160 | 374 | 458 | 1.6039 | NA |
| 8 | 50/50 | Para | 32000 | 2.0 | 188 | 467 | 521 | Brittle | NA |
| 9 | 50/50 | Para | 34000 | 2.0 | 193 | NA | NA | Brittle | 49.44 |
| 10 | 50/50 | Para | 50000-65000 | 2.4 | 197 | NA | NA | 1.6160 | NA |
| 11 | 50/50 | Meta | 89000-115000 | 3.5 | 178 | NA | NA | 1.6170 | NA |
| 12 | 50/50 | Meta | 110000 | 4.0 | 178 | 476 | 517 | NA | NA |

While the invention has been described with reference to an exemplary embodiment, it will be understood by those skilled in the art that various changes may be made and equivalents may be substituted for elements thereof without departing from the scope of the invention. In addition, many modifications may be made to adapt a situation or material to the teachings of the invention without departing from the essential scope thereof. Therefore, it is intended that the invention not be limited to the embodiment disclosed as the best mode contemplated for carrying out this invention, but that the invention will include all embodiments falling within the scope of the appended claims.

What is claimed is:

1. A polymer comprising structural units derived from a polycyclic dihydroxy compound of Formula (I)

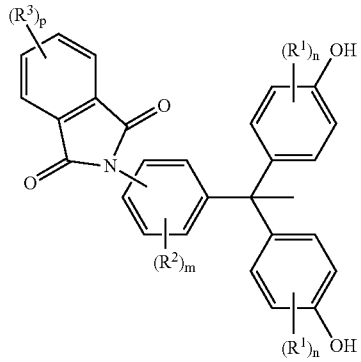

wherein $R^1$, $R^2$ and $R^3$ are independently at each occurrence selected from the group consisting of a cyano functionality, a halogen, an aliphatic functionality having 1 to 10 carbons, a cycloaliphatic functionality having 3 to 10 carbons, and an aromatic functionality having 6 to 10 carbons; wherein each occurrence of "n", "m", and "p" independently has a value of 0, 1, 2, 3, or 4; and wherein the polymer is substantially linear.

2. The polymer of claim 1, wherein the polymer is a polycarbonate, a polyester, a copolyestercarbonate, a polyurethane, or an epoxide-containing polymer.

3. The polycarbonate of claim 2, comprising structural carbonate units of Formula (XI)

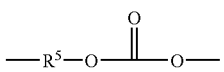

wherein at least about 60 percent of the total number of $R^5$ groups are aromatic functionalities and the balance thereof are aliphatic or alicyclic functionalities; and wherein at least two $R^5$ groups are structural units derived from a polycyclic dihydroxy compound of Formula (I).

4. The polycarbonate of claim 2, comprising about 5 to about 100 mole percent of R5 units derived from a polycyclic dihydroxy compound of Formula (I).

5. The polycarbonate of claim 2, further comprising structural units derived from bisphenol A.

6. The polycarbonate of claim 2, further comprising at least one structural unit having Formula (XVI), Formula (XVII), or Formula (XVIII)

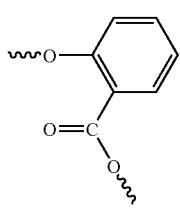

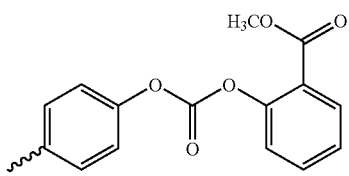

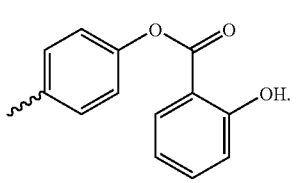

7. The polyester of claim 2, comprising structural units of the Formula (XII)

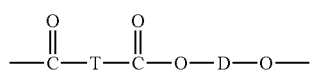
(XII)

wherein "D" is a divalent functionality derived from a dihydroxy compound, wherein at least two of "D" are each independently derived from a polycyclic dihydroxy compound of Formula (I); and wherein "T" is a divalent functionality derived from a dicarboxylic acid.

8. The polyester of claim 7, further comprising at least one structural unit having Formula (XVI), Formula (XVII), or Formula (XVIII)

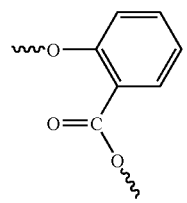
(XVI)

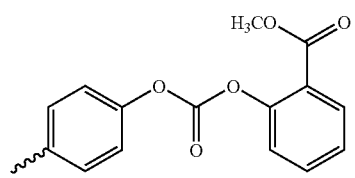
(XVII)

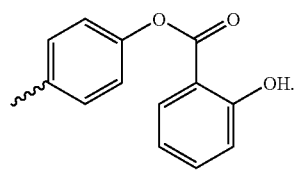
(XVIII)

9. The copolyestercarbonate of claim 2, comprising recurring carbonate units of Formula (XI)

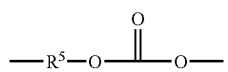
(XI)

wherein at least about 60 percent of the total number of $R^5$ groups are aromatic functionalities and the balance thereof are aliphatic, alicyclic, or aromatic functionalities and; and structural units of Formula (XII)

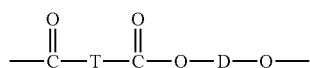
(XII)

wherein "D" is a divalent functionality derived from a dihydroxy compound; and wherein "T" is a divalent functionality derived from a dicarboxylic acid; and wherein at least two $R^5$ groups or at least two of "D" are each independently structural units derived from a polycyclic dihydroxy compound of Formula (I).

10. The copolyestercarbonate of claim 9, further comprising at least one structural unit having Formula (XVI), Formula (XVII), or Formula (XVIII)

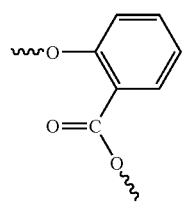
(XVI)

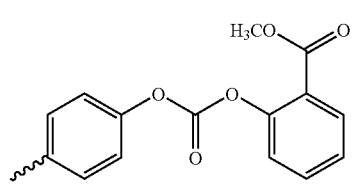
(XVII)

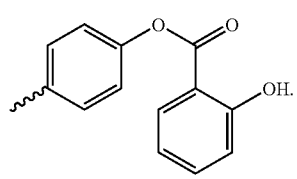
(XVIII)

11. The polyurethane of claim 2, comprising recurring units having Formula (XIII)

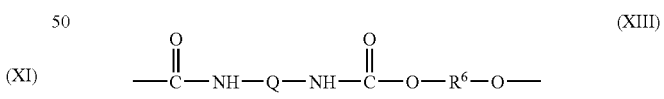
(XIII)

wherein $R^6$ is a divalent functionality derived from a dihydroxy compound; wherein at least two of $R^6$ are each independently structural units derived from a polycyclic dihydroxy compound of Formula (I); and wherein "Q" is a divalent functionality derived from a diisocyanate compound, having Formula (XIV)

Q(NCO)$_2$ (XIV)

wherein Q comprises a divalent aliphatic radical having 2 to 28 carbons, a divalent cycloaliphatic radical having 4 to 15 carbons, or a divalent aromatic radical having 6 to 15 carbons.

12. The epoxide-containing polymer of claim 2, having the structure of Formula (XV)

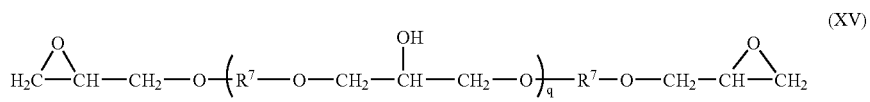

wherein $R^7$ is a divalent functionality derived from a dihydroxy compound; wherein at least two of $R^7$ are each structural units derived from a polycyclic dihydroxy compound of Formula (I); and wherein "q" is 2 to about 20.

13. A polycarbonate comprising at least two structural units derived from a polycyclic dihydroxy compound of Formula (XIX) or Formula (X)

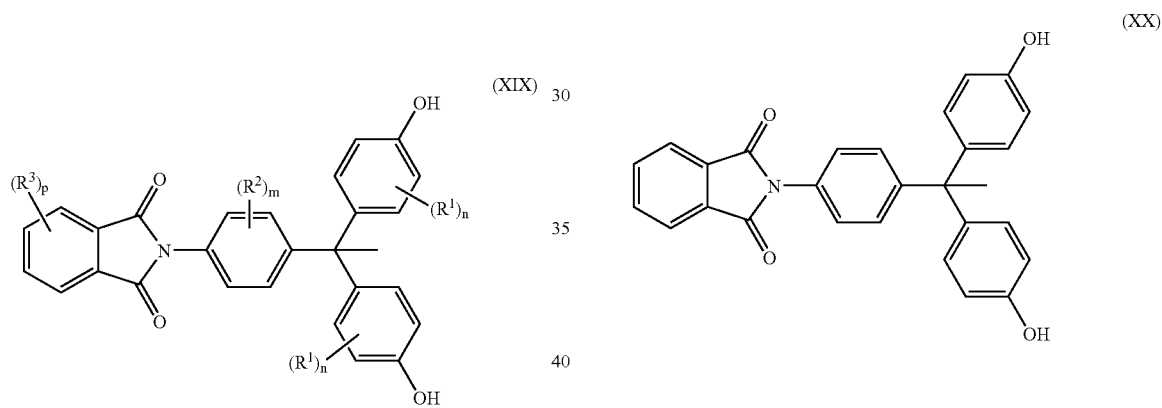

wherein $R^1$, $R^2$ and $R^3$ are independently at each occurrence selected from the group consisting of a cyano functionality, a halogen, an aliphatic functionality having 1 to 10 carbons, a cycloaliphatic functionality having 3 to 10 carbons, and an aromatic functionality having 6 to 10 carbons; wherein each occurrence of "n", "m", and "p" independently has a value of 0 or 1; wherein the polycarbonate further comprises structural units derived from bisphenol A; and wherein the polycarbonate is substantially linear.

14. A polycarbonate comprising structural units derived from a polycyclic dihydroxy compound of Formula (XX) or Formula (XXI)

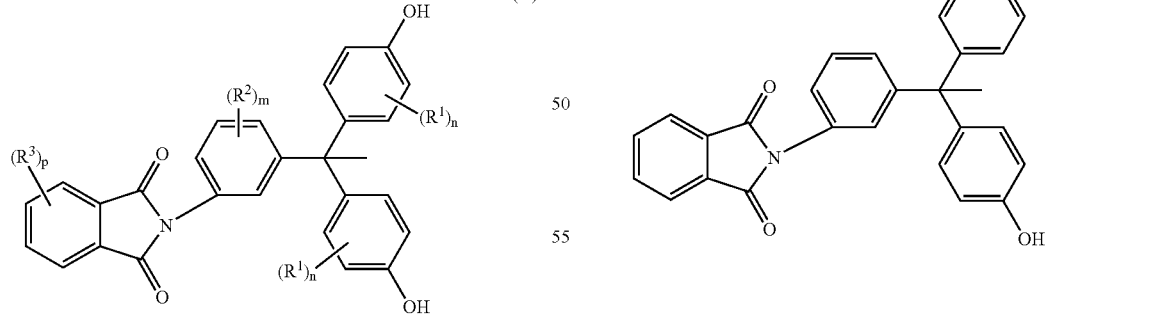

wherein the polycarbonate comprises about 5 to about 50 mole percent of repeating units derived from the polycyclic dihydroxy compound of Formula (XX) or Formula (XXI) or a mixture of the two, and about 50 to about 95 mole percent of repeating units derived from bisphenol A; and wherein the polycarbonate is substantially linear.

15. A polymer comprising structural units derived from a polycyclic dihydroxy compound of Formula (X)

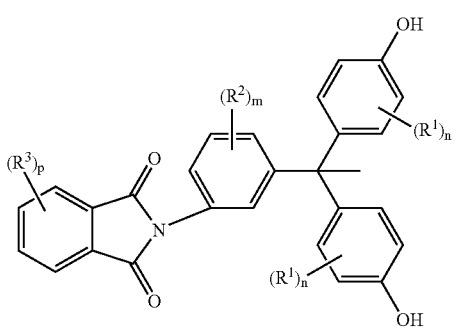

(X)

wherein $R^1$, $R^2$ and $R^3$ are independently at each occurrence selected from the group consisting of a cyano functionality, a halogen, an aliphatic functionality having 1 to 10 carbons, a cycloaliphatic functionality having 3 to 10 carbons, and an aromatic functionality having 6 to 10 carbons; and wherein each occurrence of "n", "m", and "p" independently has a value of 0, 1, 2, 3, or 4.

16. A process for preparing a polymer, comprising polymerizing a polycyclic dihydroxy compound of Formula (I)

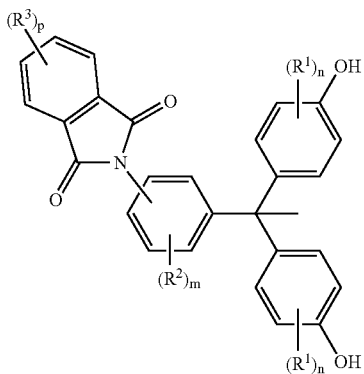

(I)

wherein $R^1$, $R^2$ and $R^3$ are independently at each occurrence selected from the group consisting of a cyano functionality, a halogen, an aliphatic functionality having 1 to 10 carbons, a cycloaliphatic functionality having 3 to 10 carbons, and an aromatic functionality having 6 to 10 carbons; wherein each occurrence of "n", "m", and "p" independently has a value of 0, 1, 2, 3, or 4; and wherein the polycarbonate is substantially linear.

17. The process of claim 16, wherein polymerizing comprises
dissolving or dispersing the polycyclic dihydroxy compound of Formula (I) in an aqueous base;
adding the resulting mixture to a water-immiscible solvent to form an interfacial mixture; and
contacting the interfacial mixture with a carbonate precursor in the presence of a catalyst under controlled pH conditions to form a polycarbonate.

18. The process of claim 17, wherein the aqueous base comprises sodium hydroxide, potassium hydroxide, or a combination thereof.

19. The process of claim 17, wherein the carbonate precursor comprises a carbonyl halide, a haloformate, a bishaloformate of a glycol, an ester, or a mixture of two or more of the foregoing carbonate precursors.

20. The process of claim 17, wherein the catalyst comprises triethylamine, a phase transfer catalyst, or a combination thereof.

21. The process of claim 17, wherein the water-immiscible solvent comprises methylene chloride, 1,2-dichloroethane, chlorobenzene, toluene, or a combination of two or more of the foregoing solvents.

22. The process of claim 17, wherein pH is maintained at about 8 to about 10.

23. The process of claim 16, wherein polymerizing comprises reacting, in a molten state, the polycyclic dihydroxy compound of Formula (I) and a diaryl carbonate ester, in the presence of a transesterification catalyst to form a polycarbonate.

24. The process of claim 23, wherein the diaryl carbonate ester comprises diphenyl carbonate, bis(methyl salicyl) carbonate, or a combination thereof.

25. The process of claim 16, wherein polymerizing comprises
reacting the polycyclic dihydroxy compound of Formula (I) with a dicarboxylic acid compound of Formula (XXII)

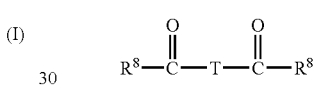

(XXII)

wherein $R^8$ is independently at each occurrence hydroxy, chloro, or $OR^9$; wherein $R^9$ is independently at each occurrence selected from the group consisting of an aliphatic functionality having 1 to 10 carbons, a cycloaliphatic functionality having 3 to 10 carbons, and an aromatic functionality having 6 to 10 carbons; and wherein "T" is a divalent functionality derived from a dicarboxylic acid, wherein the divalent functionality comprises a cycloaliphatic functionality having 6 to 10 carbon atoms, an aromatic functionality having 6 to 20 carbon atoms, or an aliphatic functionality having 2 to 10 carbon atoms.

26. The process of claim 16, wherein said polymerizing comprises
reacting a polycyclic dihydroxy compound of Formula (I) with a carbonate precursor and a dicarboxylic acid compound of Formula (XXII)

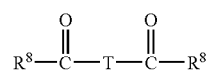

(XXII)

wherein $R^8$ is independently at each occurrence hydroxy, chioro, or $OR^9$; wherein $R^9$ is independently at each occurrence selected from the group consisting of an aliphatic functionality having 1 to 10 carbons, a cycloaliphatic functionality having 3 to 10 carbons, and an aromatic functionality having 6 to 10 carbons; and wherein "T" is a divalent functionality derived from a dicarboxylic acid, wherein the divalent functionality comprises a cycloaliphatic functionality having 6 to 10 carbon atoms, an aromatic functionality having 6 to 20 carbon atoms, or an aliphatic functionality having 2 to 10 carbon atoms.

27. The process of claim 16, wherein polymerizing comprises reacting the polycyclic dihydroxy compound of Formula (I) with a diisocyanate compound having Formula (XIV)

wherein Q comprises a divalent aliphatic radical having 2 to 28 carbons, a divalent cycloaliphatic radical having 4 to 15 carbons, or a divalent aromatic radical having 6 to 15 carbons.

28. The process of claim 27, wherein the diisocyanate compound is selected from the group consisting of toluene-2,6-diisocyanate, 1,6-hexamethylene diisocyanate, 4,4'-diphenyl methane diisocyanate, 2,4'-diphenyl methane diisocyanate, 1,3-phenylene diisocyanate, 1,4-phenylene diisocyanate, toluene-2,4-diisocyanate, and combinations of two or more of the foregoing diisocyanate compounds.

29. The process of claim 16, wherein polymerizing comprises reacting the polycyclic dihydroxy compound of Formula (I) with epichlorohydrin to form a diglycidyl ether compound of Formula (XV)

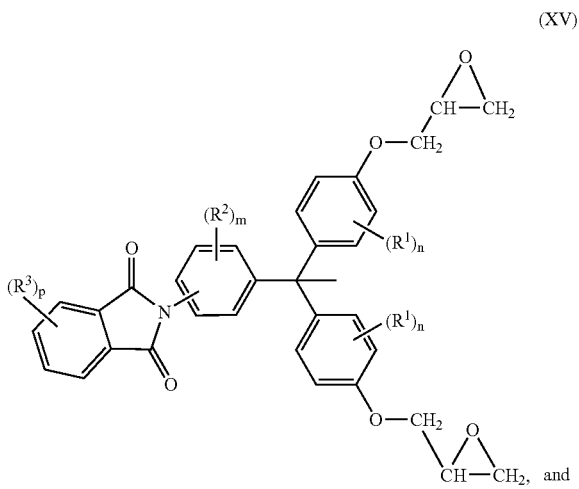

polymerizing the diglycidyl ether compound having Formula (XV), wherein R1, R2 and R3 are independently at each occurrence selected from the group consisting of a cyano functionality, a halogen, an aliphatic functionality having 1 to 10 carbons, a cycloaliphatic functionality having 3 to 10 carbons, and an aromatic functionality having 6 to 10 carbons; and wherein each occurrence of "n", "m", and "p" independently has a value of 0, 1, 2, 3, or 4.

30. A substantially linear polymer prepared according to the method of claim 16.

31. The substantially linear polymer of claim 30, wherein the substantially linear polymer is a polycarbonate prepared by a process comprising dissolving or dispersing the polycyclic dihydroxy compound of Formula (I) in an aqueous base;

adding the resulting mixture to a water-immiscible solvent to form an interfacial mixture; and contacting the interfacial mixture with a carbonate precursor in the presence of a catalyst under controlled pH conditions to form a polycarbonate.

32. The substantially linear polymer of claim 30, wherein the substantially linear polymer is a polycarbonate prepared according to a process comprising reacting, in a molten state, the polycyclic dihydroxy compound of Formula (I) and a diaryl carbonate ester, in the presence of a transesterification catalyst to form a polycarbonate.

33. The substantially linear polymer of claim 30, wherein the substantially linear polymer is a polyester prepared according to a process comprising reacting the polycyclic dihydroxy compound of Formula (I) with a dicarboxylic acid compound of Formula (XXII)

wherein $R^8$ is independently at each occurrence hydroxy, chloro, or $OR^9$; wherein $R^9$ is independently at each occurrence selected from the group consisting of an aliphatic functionality having 1 to 10 carbons, a cycloaliphatic functionality having 3 to 10 carbons, and an aromatic functionality having 6 to 10 carbons; and wherein "T" is a divalent functionality derived from a dicarboxylic acid, wherein the divalent functionality comprises a cycloaliphatic functionality having 6 to 10 carbon atoms, an aromatic functionality having 6 to 20 carbon atoms, or an aliphatic functionality having 2 to 10 carbon atoms.

34. The substantially linear polymer of claim 30, wherein the substantially linear polymer is a copolyestercarbonate prepared according to a process comprising reacting a polycyclic dihydroxy compound of Formula (I) with a carbonate precursor and a dicarboxylic acid compound of Formula (XXII)

wherein $R^8$ is independently at each occurrence hydroxy, chloro, or $OR^9$; wherein $R^9$ is independently at each occurrence selected from the group consisting of an aliphatic functionality having 1 to 10 carbons, a cycloaliphatic functionality having 3 to 10 carbons, and an aromatic functionality having 6 to 10 carbons; and wherein "T" is a divalent functionality derived from a dicarboxylic acid, wherein the divalent functionality comprises a cycloaliphatic functionality having 6 to 10 carbon atoms, an aromatic functionality having 6 to 20 carbon atoms, or an aliphatic functionality having 2 to 10 carbon atoms.

35. The substantially linear polymer of claim 30, wherein the substantially linear polymer is a polyurethane prepared according to a process comprising reacting the polycyclic dihydroxy compound of Formula (I) with a diisocyanate compound having Formula (XIV)

wherein Q comprises a divalent aliphatic radical having 2 to 28 carbons, a divalent cycloaliphatic radical having 4 to 15 carbons, or a divalent aromatic radical having 6 to 15 carbons.

36. The substantially linear polymer of claim 30, wherein the substantially linear polymer is an epoxide-containing polymer prepared according to a process comprising reacting the polycyclic dihydroxy compound of Formula (I) with epichlorohydrin to form a diglycidyl ether compound of Formula (XV)

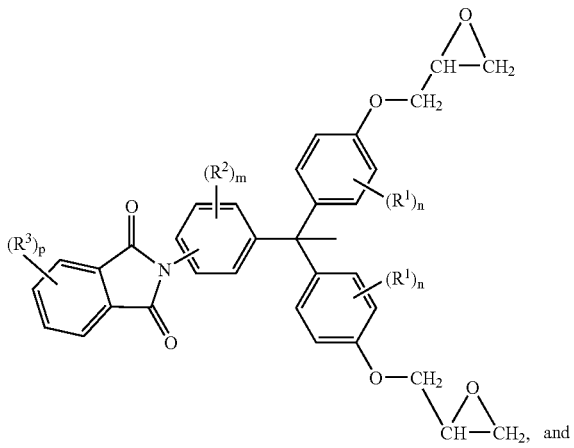

polymerizing the diglycidyl ether compound having Formula (XV), wherein $R^1$, $R^2$ and $R^3$ are independently at each occurrence selected from the group consisting of a cyano functionality, a halogen, an aliphatic functionality having 1 to 10 carbons, a cycloaliphatic functionality having 3 to 10 carbons, and an aromatic functionality having 6 to 10 carbons; and wherein each occurrence of "n", "m", and "p" independently has a value of 0, 1, 2, 3, or 4.

37. A thermoplastic composition comprising a polymer comprising structural units derived from a polycyclic dihydroxy compound of Formula (I)

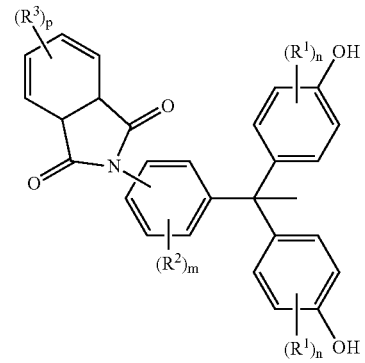

wherein $R^1$, $R^2$ and $R^3$ at each occurrence, can be the same or different and are independently at each occurrence selected from the group consisting of a cyano functionality, a halogen, an aliphatic functionality having 1 to 10 carbons, a cycloaliphatic functionality having 3 to 10 carbons, and an aromatic functionality having 6 to 10 carbons; wherein each occurrence of "n", "m", and "p" independently has a value of 0, 1, 2, 3, or 4; and wherein the polymer is substantially linear.

38. The thermoplastic composition of claim 37, further comprising an additive selected from the group consisting of fillers, reinforcing agents, thermal stabilizers, radiation stabilizers, antioxidants, light stabilizers, UV stabilizers, plasticizers, visual effect enhancers, extenders, antistatic agents, catalyst quenchers, mold release agents, flame retardants, infrared shielding agents, whitening agents, blowing agents, anti-drip agents, impact modifiers, processing aids, and combinations of two or more of the foregoing additives.

39. An article comprising the composition of claim 37.

40. A method of manufacture of an article comprising molding, extruding, or shaping the composition of claim 37 into an article.

* * * * *